US 12,201,183 B2

United States Patent
Bailey et al.

(10) Patent No.: US 12,201,183 B2
(45) Date of Patent: *Jan. 21, 2025

(54) CUSHIONING ARTICLE WITH TENSILE COMPONENT AND METHOD OF MANUFACTURING A CUSHIONING ARTICLE

(71) Applicant: NIKE, Inc., Beaverton, OR (US)

(72) Inventors: Page J. Bailey, Portland, OR (US); Jeremy L. Connell, Portland, OR (US); Jason R. Meeker, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/507,231

(22) Filed: Nov. 13, 2023

(65) Prior Publication Data
US 2024/0081477 A1    Mar. 14, 2024

Related U.S. Application Data

(60) Continuation of application No. 18/092,669, filed on Jan. 3, 2023, now Pat. No. 11,849,802, which is a
(Continued)

(51) Int. Cl.
*A43B 13/20* (2006.01)
*A43B 1/00* (2006.01)
(Continued)

(52) U.S. Cl.
CPC ............ *A43B 13/20* (2013.01); *A43B 1/0009* (2013.01); *A43B 9/12* (2013.01); *A43B 13/04* (2013.01);
(Continued)

(58) Field of Classification Search
CPC ......... A43B 13/20; A43B 1/0009; A43B 9/12; A43B 13/04; A43B 13/181; A43B 17/006;
(Continued)

(56) References Cited

U.S. PATENT DOCUMENTS 4,906,502 A * 3/1990 Rudy ............... A43B 13/20
36/43
2002/0139471 A1* 10/2002 Tawney ............ B29D 22/02
156/205
(Continued)

FOREIGN PATENT DOCUMENTS

WO    9809546 A1    3/1998

*Primary Examiner* — Cynthia L Schaller
(74) *Attorney, Agent, or Firm* — Quinn IP Law

(57) ABSTRACT

A cushioning article comprises a first and a second polymeric sheet bonded to one another and enclosing an interior cavity. The polymeric sheets retain a gas in the interior cavity. A tensile component disposed in the interior cavity includes a first tensile layer, a second tensile layer, and a plurality of tethers spanning the interior cavity and connecting the first tensile layer to the second tensile layer. An inwardly-protruding bond joins the first polymeric sheet to the first tensile layer, protrudes inward from the first polymeric sheet toward the second polymeric sheet, and partially traverses the plurality of tethers. The first polymeric sheet is displaced from the first tensile layer adjacent to the inwardly-protruding bond by the gas. A method of manufacturing a cushioning article is disclosed.

20 Claims, 14 Drawing Sheets

Related U.S. Application Data continuation of application No. 16/883,093, filed on May 26, 2020, now Pat. No. 11,571,039, which is a division of application No. 15/982,749, filed on May 17, 2018, now Pat. No. 10,694,814.

(60) Provisional application No. 62/508,044, filed on May 18, 2017.

(51) Int. Cl.

| | | |
|---|---|---|
| *A43B 9/12* | (2006.01) | |
| *A43B 13/04* | (2006.01) | |
| *A43B 13/18* | (2006.01) | |
| *A43B 17/00* | (2006.01) | |
| *B29D 35/12* | (2010.01) | |
| *B29D 35/14* | (2010.01) | |
| *B32B 3/12* | (2006.01) | |
| *B32B 7/05* | (2019.01) | |
| *B32B 27/00* | (2006.01) | |
| *B32B 27/08* | (2006.01) | |
| *B32B 27/30* | (2006.01) | |
| *B32B 27/40* | (2006.01) | |
| *B29C 65/00* | (2006.01) | |
| *B29C 65/04* | (2006.01) | |
| *B29C 65/14* | (2006.01) | |
| *B29K 23/00* | (2006.01) | |
| *B29K 75/00* | (2006.01) | |

(52) U.S. Cl.
CPC .......... *A43B 13/181* (2013.01); *A43B 17/006* (2013.01); *B29D 35/122* (2013.01); *B29D 35/142* (2013.01); *B32B 3/12* (2013.01); *B32B 7/05* (2019.01); *B32B 27/00* (2013.01); *B32B 27/08* (2013.01); *B32B 27/306* (2013.01); *B32B 27/40* (2013.01); *B29C 65/04* (2013.01); *B29C 65/14* (2013.01); *B29C 66/004* (2013.01); *B29K 2023/086* (2013.01); *B29K 2075/00* (2013.01); *B29K 2995/0067* (2013.01); *B32B 2307/7242* (2013.01); *B32B 2437/02* (2013.01)

(58) Field of Classification Search
CPC ...... B29D 35/122; B29D 35/142; B32B 3/12; B32B 7/05; B32B 27/00; B32B 27/08; B32B 27/306; B32B 27/40; B32B 2307/7242; B32B 2437/02; B29C 65/04; B29C 65/14; B29C 66/004; B29K 2075/00
See application file for complete search history.

(56) References Cited

U.S. PATENT DOCUMENTS

| | | |
|---|---|---|
| 2006/0010717 A1 | 1/2006 | Finkelstein |
| 2011/0277347 A1* | 11/2011 | Monfils .................. A43B 13/20 36/29 |

* cited by examiner

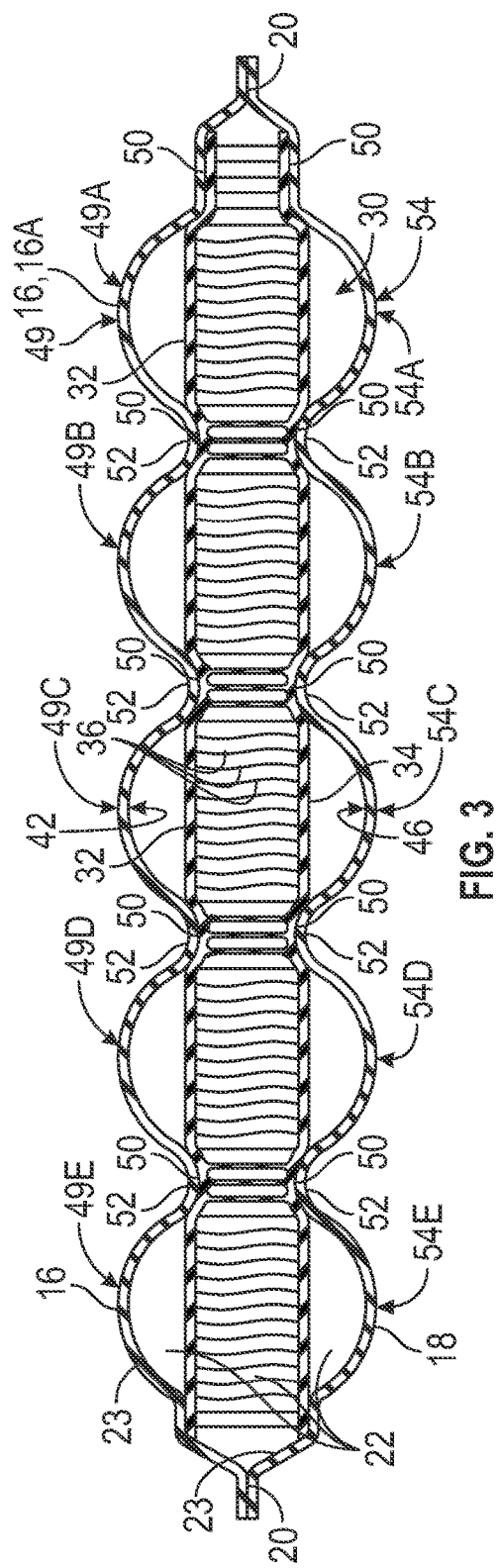
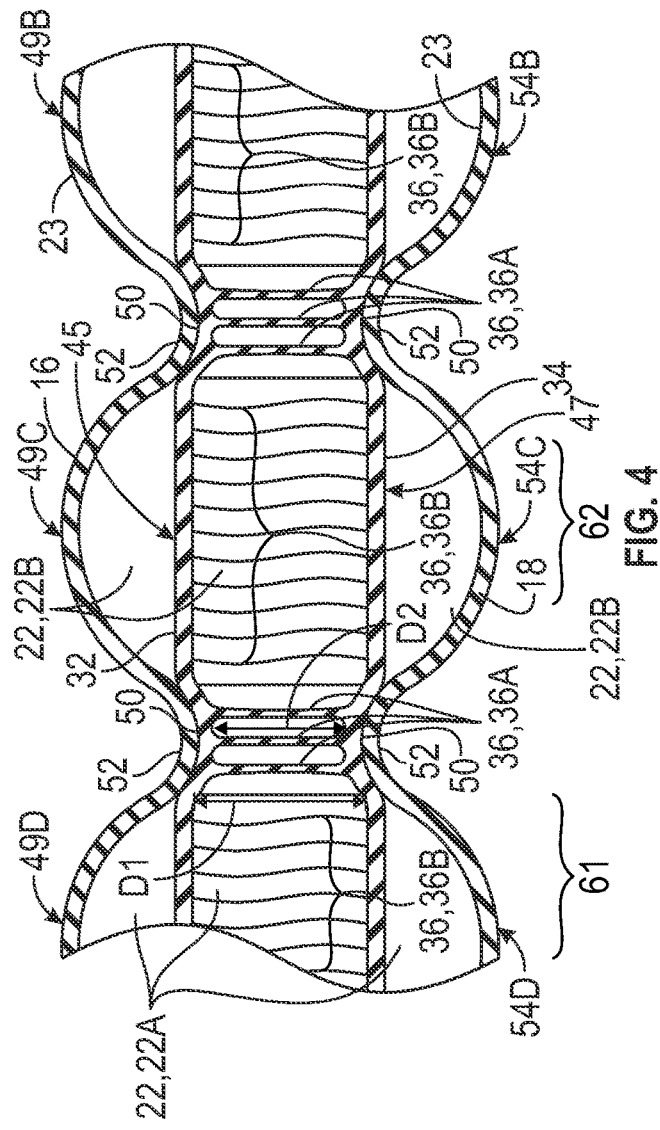

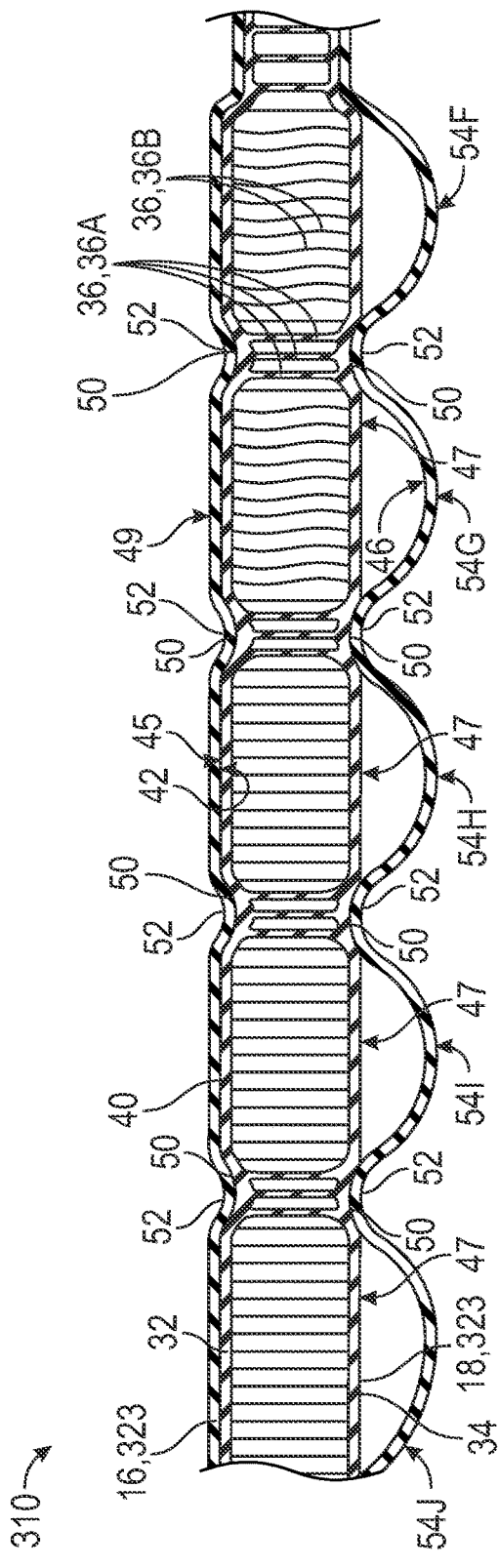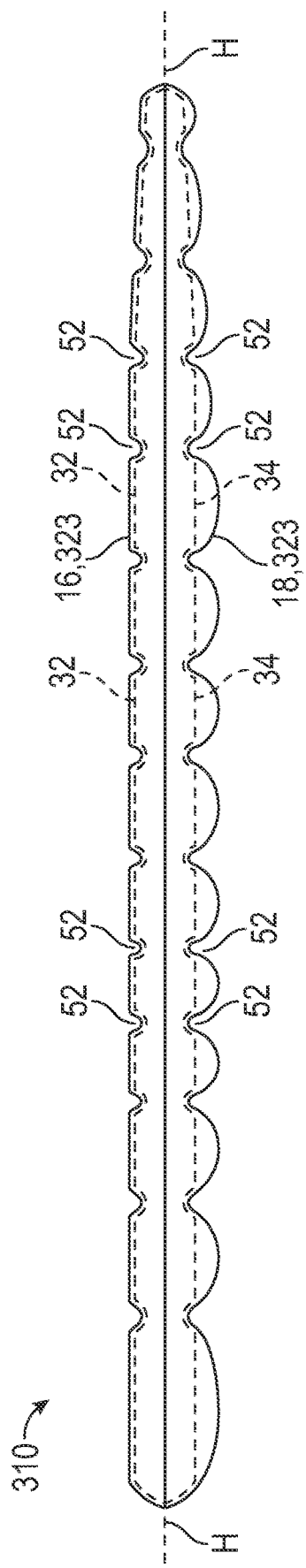
FIG. 23
FIG. 24

CUSHIONING ARTICLE WITH TENSILE COMPONENT AND METHOD OF MANUFACTURING A CUSHIONING ARTICLE

CROSS-REFERENCE TO RELATED APPLICATIONS

This application is a continuation of U.S. Nonprovisional application Ser. No. 18/092,669, filed Jan. 3, 2023, which is a continuation of U.S. Nonprovisional application Ser. No. 16/883,093 filed on May 26, 2020, now U.S. Pat. No. 11,571,039, issued Feb. 7, 2023, which is a divisional of U.S. Nonprovisional application Ser. No. 15/982,749 filed on May 17, 2018, now U.S. Pat. No. 10,694,814, issued Jun. 30, 2020, which claims the benefit of priority to U.S. Provisional Application No. 62/508,044 filed on May 18, 2017, and each of which is hereby incorporated by reference in its entirety.

TECHNICAL FIELD

The present teachings generally include a cushioning article having a tensile component, and a method of manufacturing the cushioning article with an inwardly-protruding bond.

BACKGROUND

A cushioning article, such as a sole component of an article of footwear, is typically configured to provide cushioning, motion control, and/or resilience. Some cushioning articles utilize a sealed interior cavity filled with a gas that resiliently reacts a compressive load. A tensile component may be disposed in the interior cavity, and may limit the outward expansion of the cushioning article.

BRIEF DESCRIPTION OF THE DRAWINGS

FIG. 3 is a schematic illustration in cross-sectional view of the cushioning article of FIG. 1, taken at lines 3-3 in FIG. 1.

FIG. 4 is a schematic illustration in close-up cross-sectional view of a portion of the cushioning article of FIG. 3.

FIG. 23 is a schematic illustration in cross-sectional view of the cushioning article of FIG. 21, taken at lines 23-23 in FIG. 21.

FIG. 24 is a schematic illustration in medial side view of the cushioning article of FIG. 21.

DESCRIPTION

Figure 1:
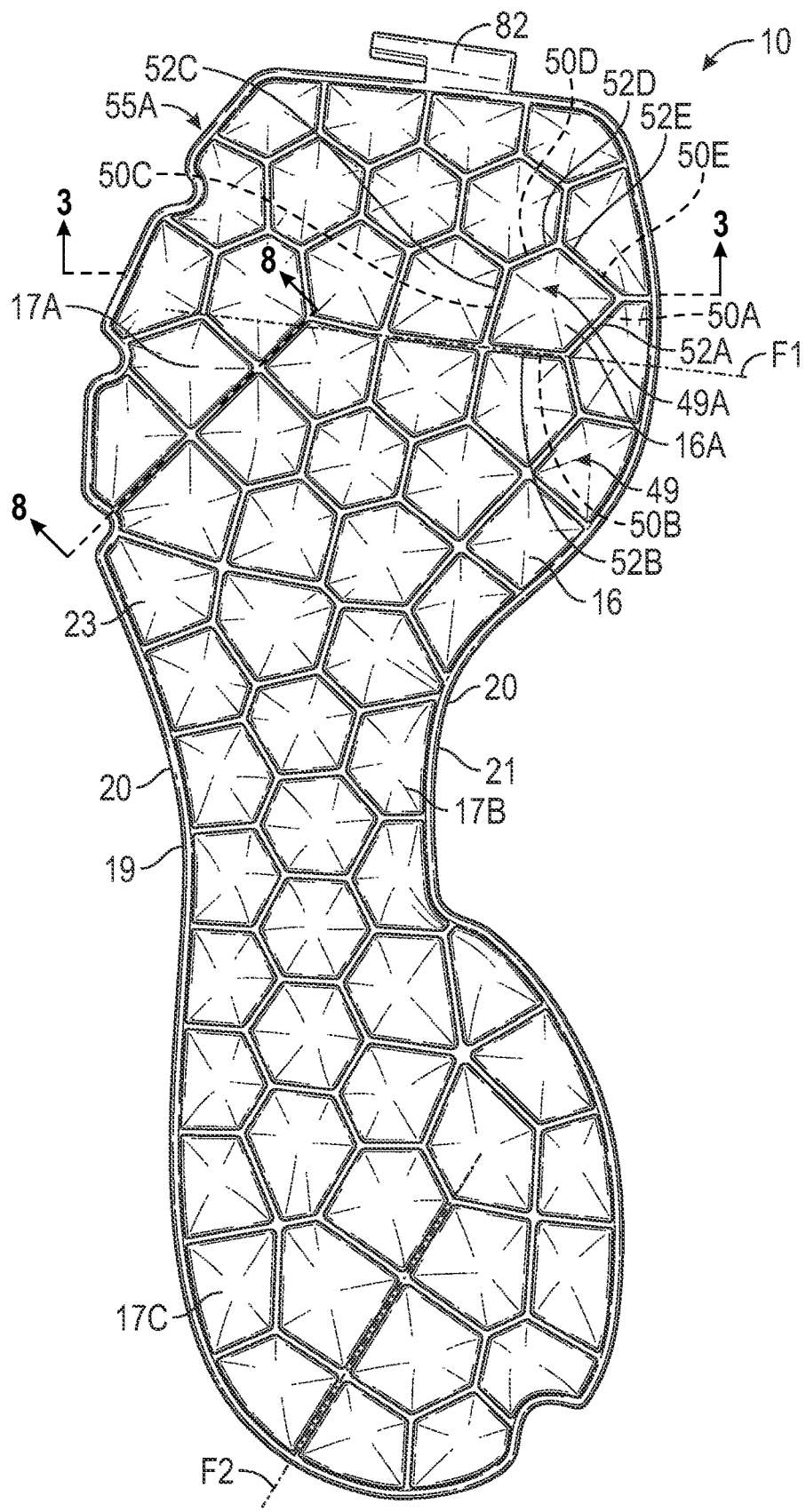
FIG. 1 is a schematic illustration in plan view of a cushioning article in accordance with the present teachings.

A cushioning article comprises a bladder enclosing an interior cavity and retaining a gas in the interior cavity. A tensile component is disposed in the interior cavity and includes tensile layers and a plurality of tethers connecting the tensile layers. The tensile layers are connected to an inner surface of the bladder such that the tethers span across the interior cavity. The bladder has a plurality of bonds arranged in closed shapes surrounding domed portions of the bladder. The plurality of bonds bond the inner surface of the bladder to the tensile component. The domed portions of the bladder are unbonded to the tensile component and are therefore displaced from the tensile component by the gas.

In one or more embodiments, the bladder comprises a first polymeric sheet and a second polymeric sheet bonded to one another at a peripheral flange and enclosing the interior cavity. The tensile layers include a first tensile layer connected to the first polymeric sheet and a second tensile layer connected to the second polymeric sheet. At least one of the first polymeric sheet and the second polymeric sheet includes the domed portions.

The plurality of bonds may protrude inward into the interior cavity and partially traverse the plurality of tethers such that the bladder is narrowed at the plurality of bonds. When an inflation pressure of the gas in the interior cavity is sufficient to tension the plurality of tethers, the plurality of bonds defines grooves at an outer surface of the bladder such that the cushioning article is articulated along the grooves.

The plurality of bonds may be a first plurality of bonds in a first region of the bladder, and the bladder may have a second plurality of bonds arranged in closed shapes in a second region of the bladder. Portions of the bladder surrounded by the closed shapes in the second region may be bonded to the tensile component.

The cushioning article may be for a variety of applications, such as but not limited to a sole component of an article of footwear. In such an embodiment, the first region may be on a distal side of the bladder (i.e., a ground contact side), and the second region may be on a proximal side of the bladder (i.e., a foot-facing side). In other embodiments, the first region and the second region are both on a distal side of the bladder or are both on a proximal side of the bladder. In still other embodiments, the plurality of bonds are a first plurality of bonds in a first region of the bladder, and the bladder has a second plurality of bonds arranged in closed shapes in a second region of the bladder. Portions of the bladder surrounded by the closed shapes in the second region are unbonded to the tensile component and form domed portions that are displaced from the tensile component by the gas. For example, both the proximal side and the distal side of the cushioning article may have the domed portions.

A cushioning article comprises a first polymeric sheet and a second polymeric sheet bonded to one another and enclosing an interior cavity. The first polymeric sheet and the second polymeric sheet retain a gas in the interior cavity. A tensile component is disposed in the interior cavity. The tensile component includes a first tensile layer, a second tensile layer, and a plurality of tethers spanning the interior cavity from the first tensile layer to the second tensile layer and connecting the first tensile layer to the second tensile layer. An inwardly-protruding bond joins the first polymeric sheet to the first tensile layer, protrudes inward from the first polymeric sheet toward the second polymeric sheet, and partially traverses the plurality of tethers. The first polymeric sheet is displaced from the first tensile layer adjacent to the inwardly-protruding bond by the gas. The inwardly-protruding bond is spaced apart from the second polymeric sheet such that the interior cavity is narrowed at the inwardly-protruding bond and the gas in the interior cavity fluidly communicates across the inwardly-protruding bond. Accordingly, the consistency and responsiveness of tethers in returning the interior cavity to its original shape following a dynamic compressive load is combined with staged cushioning, and the flexibility of an articulated cushioning component, with articulation occurring in alignment with the tethers traversed by the inwardly-protruding bond.

In one or more embodiments, the cushioning article is a sole component for an article of footwear, and the inwardly-protruding bond establishes a flexion axis of the sole component. Accordingly, the cushioning component may be articulated at the inwardly-protruding bond, and the flexion axes may be aligned with desired flexion regions of a foot, for example, such as the metatarsal-phalangeal joints.

In one or more embodiments, a portion of the interior cavity at a first side of the inwardly-protruding bond is in fluid communication with a portion of the interior cavity at a second side of the inwardly-protruding bond, with the second side opposite of the first side. The gas in the interior cavity can thus be displaced across the inwardly-protruding bond, such as during a foot strike or foot roll of an article of footwear when the cushioning article is included in a sole structure.

In one or more embodiments, an inflation pressure of the gas in the interior cavity is sufficient to tension the plurality of tethers at the inwardly-protruding bond, and the inwardly-protruding bond defines a groove at an outer surface of the first polymeric sheet such that the cushioning article is divided into a first article portion on one side of the groove and a second article portion on the other side of the groove, and the first article portion is articulated relative to the second article portion along the groove.

In one or more embodiments, the first tensile layer is spaced apart from the second tensile layer by a first distance at a location adjacent to the inwardly-protruding bond, and the inwardly-protruding bond is spaced apart from the second tensile layer by a second distance. The second distance is between 50 percent and 80 percent of the first distance. Narrowing of the interior cavity by this ratio may provide an optimal range of articulation that contributes to flexibility of the cushioning article.

Because the inwardly-protruding bond at least partially traverses the plurality of tethers, in one or more embodiments, the plurality of tethers includes tethers aligned with the inwardly-protruding bond and tethers displaced from the inwardly-protruding bond. The tethers aligned with the inwardly-protruding bond are shorter, thicker, or both shorter and thicker than the tethers displaced from the inwardly-protruding bond. The tethers are originally all of the same length and width prior to manufacturing the cushioning article and establishing the inwardly-protruding bond. The deformation of the tethers that occurs during manufacturing at the inwardly-protruding bond contributes to the articulation and flexibility of the cushioning article.

In one or more embodiments, the inwardly-protruding bond defines a closed shape surrounding a portion of the first polymeric sheet displaced from the first tensile layer such that the portion of the first polymeric sheet has a domed surface extending away from the first tensile layer.

In some embodiments, the second polymeric sheet is recessed inward toward the inwardly-protruding bond of the first polymeric sheet when the interior cavity is inflated. In other embodiments, the second polymeric sheet also has inwardly-protruding bonds.

In some embodiments, the inwardly-protruding bond may be a first inwardly-protruding bond, the portion of the first polymeric sheet surrounded by the closed shape is a first portion of the first polymeric sheet in a first region of the first polymeric sheet, an inner surface of a second portion of the first polymeric sheet in a second region of the first polymeric sheet spaced apart from the first region is bonded to an outer surface of the first tensile layer; and the cushioning article may further comprise a second inwardly-protruding bond that joins the first polymeric sheet to the first tensile layer and protrudes from the first polymeric sheet toward the second polymeric sheet in the second region and partially traverses the tensile component. The second inwardly-protruding bond may be spaced apart from the second polymeric sheet such that the interior cavity is narrowed at the second inwardly-protruding bond and the gas in the interior cavity fluidly communicates across the second inwardly-protruding bond.

A method of manufacturing a cushioning article comprises disposing anti-weld material on at least one of an inner surface of a first polymeric sheet and an outer surface of a first tensile layer of a tensile component. The tensile component includes the first tensile layer, a second tensile layer, and a plurality of tethers connecting the first tensile layer to the second tensile layer. The method further comprises conforming the first polymeric sheet and a second polymeric sheet to components of a mold. Conforming the first polymeric sheet in this manner depresses the first polymeric sheet toward the second polymeric sheet at protrusions of the mold arranged in closed shapes and with the protrusion directly outward of the plurality of tethers. The method further comprises thermally bonding the first tensile layer to the first polymeric sheet and the second tensile layer to the second polymeric sheet opposite the first tensile layer. Thermally bonding the tensile layers to the polymeric sheets in this manner produces a plurality of bonds at the protrusion that joins the first polymeric sheet to the first tensile layer and partially traverses the plurality of tethers. The plurality of bonds protrude toward the second polymeric sheet and are spaced apart from the second tensile layer and the second polymeric sheet. The first polymeric sheet is separated from the first tensile layer adjacent to the inwardly-protruding bonds due to the anti-weld material such that portions of the first polymeric sheet surrounded by the plurality of bonds forming the closed shapes are displaceable from the first tensile layer. For example, when inflated, a portion of the first polymeric surrounded by bonds forming a closed shape forms a domed surface.

In one or more embodiments, the method further comprises bonding the first polymeric sheet to the second polymeric sheet at a peripheral bond such that the first polymeric sheet and the second polymeric sheet at least partially enclose an interior cavity containing the tensile component. The plurality of tethers span across the interior cavity from the first tensile layer to the second tensile layer. The plurality of bonds protrudes inward such that the interior cavity is narrowed at the inwardly-protruding bond.

In one or more embodiments, the method further comprises inflating and sealing the interior cavity. Inflating the interior cavity in this manner lifts the portions of the first polymeric sheet surrounded by the closed shapes away from the tensile component to form the domed portions, and tensions the plurality of tethers at the plurality of bonds to creates a plurality of grooves in an outer surface of the first polymeric sheet at the plurality of bonds, thereby articulating the cushioning article. For example, the cushioning article may be a sole component for an article of footwear, and the groove may establish a flexion axis of the sole component.

In one or more embodiments, the components of the mold include a first mold portion and a second mold portion. At least one of the first mold portion and the second mold portion is translatable relative to the other of the first mold portion and the second mold portion between an open position and a closed position. Bonding the first polymeric sheet and the second polymeric sheet at the peripheral bond includes compressing the first polymeric sheet and the second polymeric sheet between the first mold portion and the second mold portion in the closed position.

In one or more embodiments, the mold component having the plurality of protrusions is one of the first mold portion and the second mold portion. Alternatively, in other embodiments, the mold component having the plurality of protrusions is a mold insert. This enables the bond pattern of the cushioning articles manufactured according to the method to be easily changed by changing the mold insert to a different mold insert that has a different pattern of protrusions. For example, the method may further comprise, prior to conforming the first polymeric sheet and the second polymeric sheets to components of the mold, securing a mold insert to a mold portion of the mold, and wherein the mold component having the plurality of protrusions is the mold insert. In some embodiments, the mold insert is a first mold insert, the mold portion is a first mold portion, the plurality of bonds is a first plurality of bonds, and the method further comprises securing a second mold insert to a second mold portion of the mold, wherein the second mold insert has a second plurality of protrusions directly opposite the first plurality of protrusions and outward of the plurality of tethers. In such an embodiment, conforming the first and second polymeric sheets and thermally bonding the first tensile layer to the first polymeric sheet and the second tensile layer to the second polymeric sheet produces a second plurality of bonds at the second plurality of protrusions partially traversing the tensile component directly opposite the first plurality of bonds. The second plurality of bonds protrudes toward the first plurality of bonds and the first polymeric sheet, and is spaced apart from the first plurality of bonds, the first tensile layer, and the first polymeric sheet.

In one or more embodiments, the cushioning article is a first cushioning article, and the method further comprises manufacturing a second cushioning article by removing the mold insert from the mold portion, and securing a second mold insert having a second plurality of protrusions to the mold portion. The second plurality of protrusions is shaped, dimensioned or positioned differently than the first plurality of protrusions. The method further comprises conforming a subsequent first polymeric sheet and a subsequent second polymeric sheet to the second mold insert and to another one of the components of the mold, respectively, with a subsequent tensile component between the subsequent first polymeric sheet and the subsequent second polymeric sheet. Conforming the subsequent first and second polymeric sheets in this manner depresses the subsequent first polymeric sheet toward the subsequent second polymeric sheet at the second plurality of protrusions, with the second plurality of protrusions directly outward of the subsequent tensile component, thereby producing a second plurality of bonds at the second plurality of protrusions partially traversing the subsequent tensile component. The mold thus provides the second cushioning article with a different bond pattern than the first cushioning article due to the second mold insert.

In one or more embodiments, conforming the first polymeric sheet and the second polymeric sheet to components of the mold is by vacuum, compression, or both. Additionally, in one or more embodiments, thermal bonding of the first tensile layer to the first polymeric sheet and the second tensile layer to the second polymeric sheet includes at least one of heating the first polymeric sheet and the second polymeric sheet, heating the mold components, or radio frequency welding.

The above features and advantages and other features and advantages of the present teachings are readily apparent from the following detailed description of the modes for carrying out the present teachings when taken in connection with the accompanying drawings.

Figure 20:
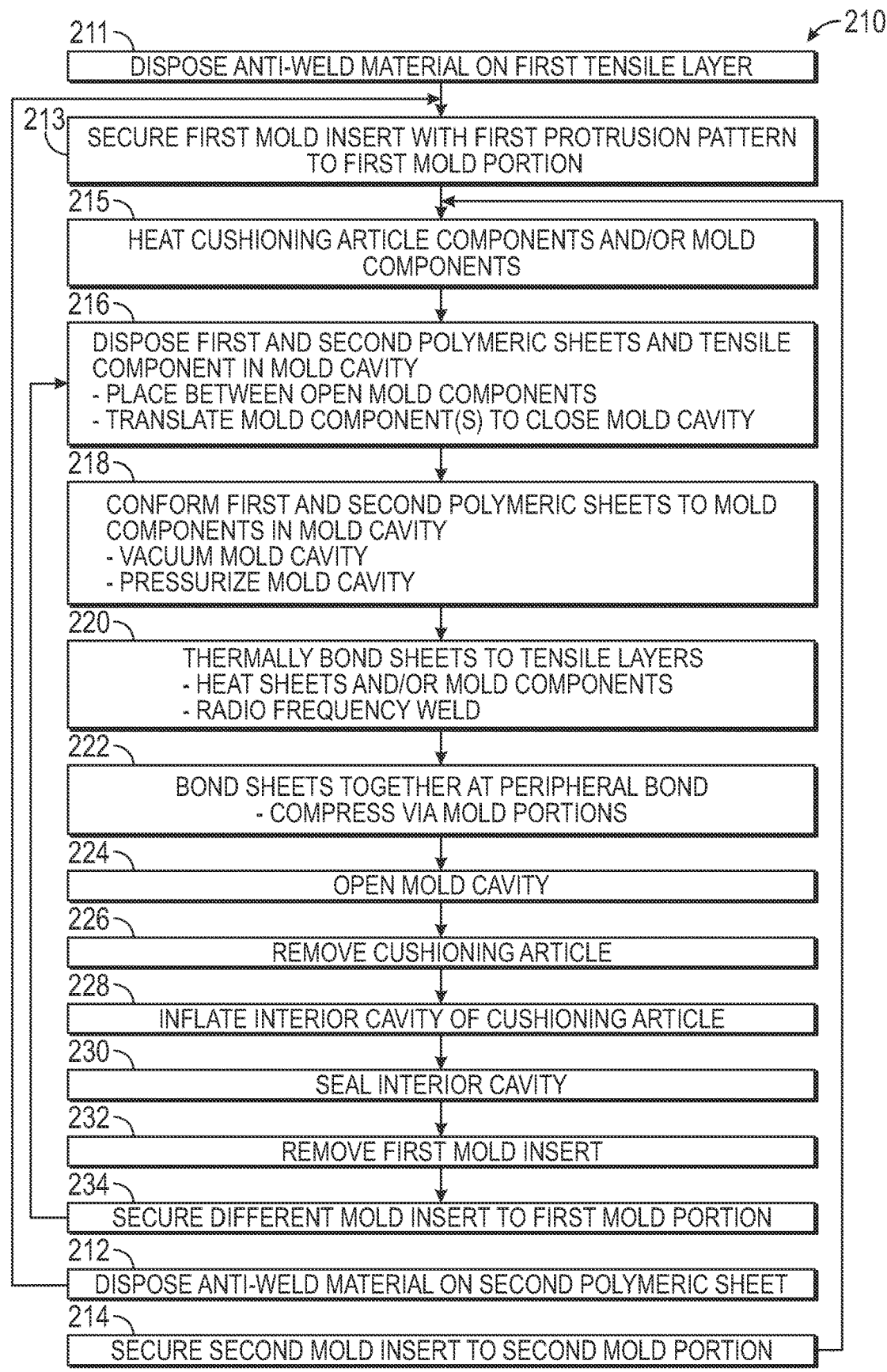
FIG. 20 is a flow chart of a method of manufacturing a cushioning article.
Figure 21:
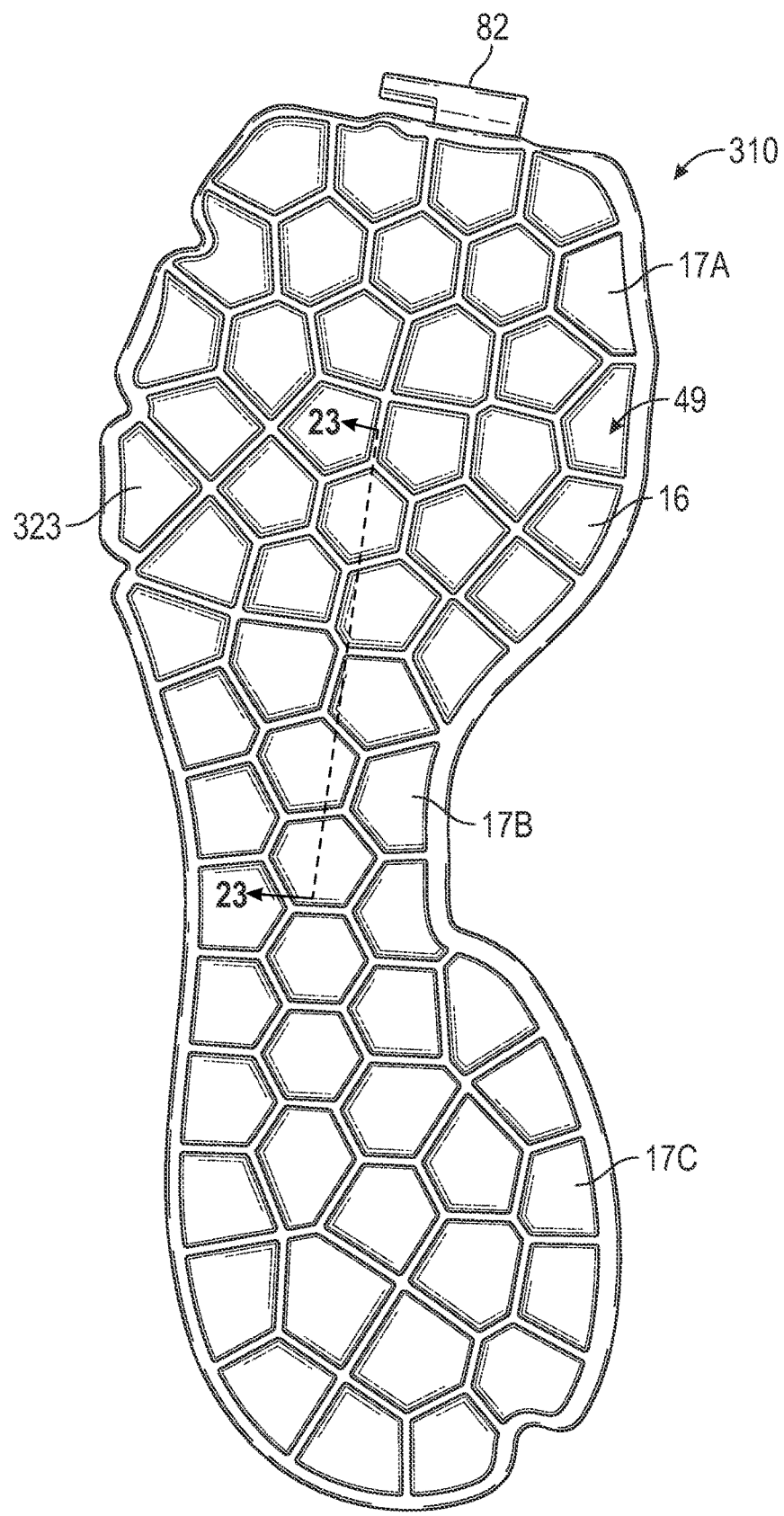
FIG. 21 is a schematic illustration in plan view of a cushioning article in accordance with an alternative aspect of the present teachings.
Figure 22:
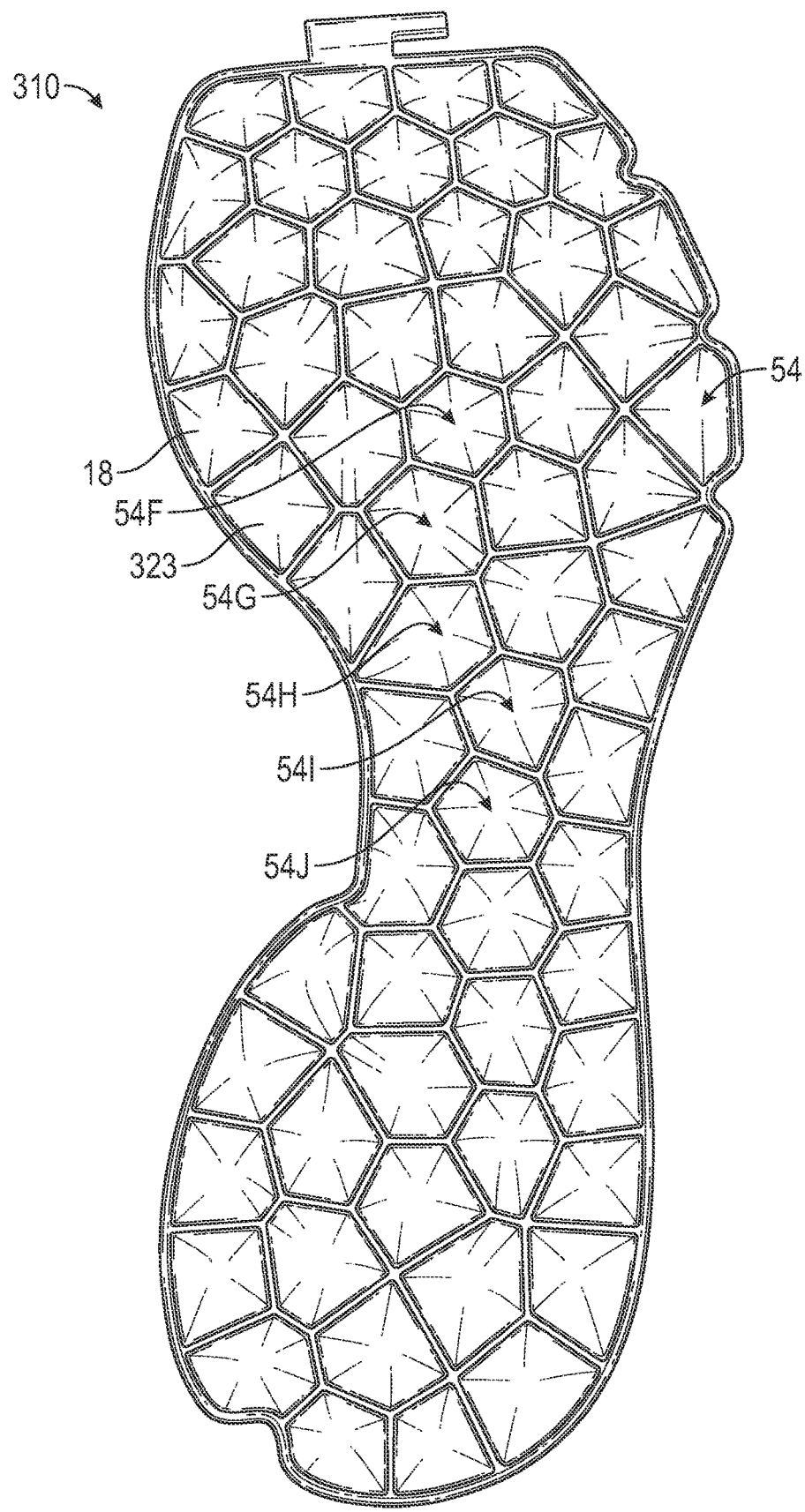
FIG. 22 is a schematic illustration in bottom view of the cushioning article of FIG. 21.

Referring to the drawings, wherein like reference numbers refer to like components throughout the views, FIG. 1 shows a cushioning article 10 that may be manufactured according to a method 210 of FIG. 20 and has features that provide a desirable combination of cushioning and flexibility. The cushioning article 10 is shown and described as a cushioning article used in a sole structure 12 of an article of footwear 14, shown in FIG. 9. The cushioning article 10 is a full length cushioning article for a sole structure 12, as it has a forefoot region 17A, a midfoot region 17B, and a heel region 17C. The forefoot region 17A may be generally associated with the toes and joints connecting the metatarsals with the phalanges. The midfoot region 17B may be generally associated with the arch of a foot. The heel region 17C may be generally associated with the heel of a foot, including the calcaneus bone. The cushioning article 10 has a lateral side 19 and a medial side 21. In particular, the lateral side 19 and the medial side 21 may be opposing sides of the cushioning article 10, and may extend along the forefoot region 17A, the midfoot region 17B, and the heel region 17C. In the embodiment of the cushioning article 10 shown in FIGS. 1 and 2, the first polymeric sheet 16 establishes the proximal side of the bladder 23 (i.e., the side closest to the foot when assembled in an article of footwear). The second polymeric sheet 18 establishes the distal side of the bladder 23 (i.e., the ground-facing side of the bladder).

Figure 9:
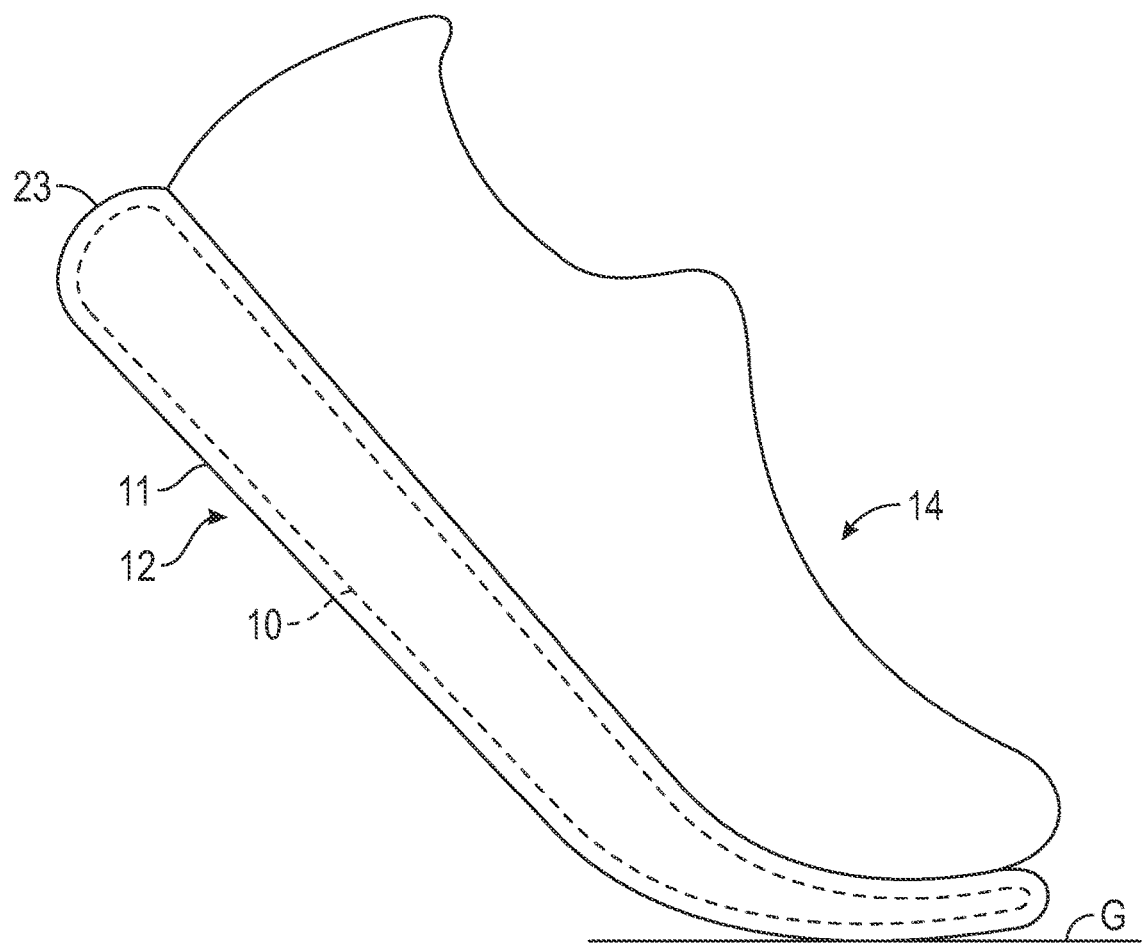
FIG. 9 is a schematic illustration in medial side view of an article of footwear with a sole structure that includes the cushioning article of FIG. 1, indicated in hidden lines.

In FIG. 9, the cushioning article 10 is shown at least partially encased in a foam sole layer 11, and together the cushioning article 10 and sole layer 11 serve as a midsole of the sole structure 12. An outsole, an insole, and other sole components may also be included in the sole structure 12. The cushioning article 10 is thus a sole component. However, the cushioning article 10 or other cushioning articles manufactured according to the method 210 may be used in other articles, such as athletic apparel, sports equipment, furniture, and floor mats. For example, the cushioning article may be for a backpack strap, a helmet cushion, a shin guard, a baseball glove, a seat cushion, or a floor mat.

Figure 2:
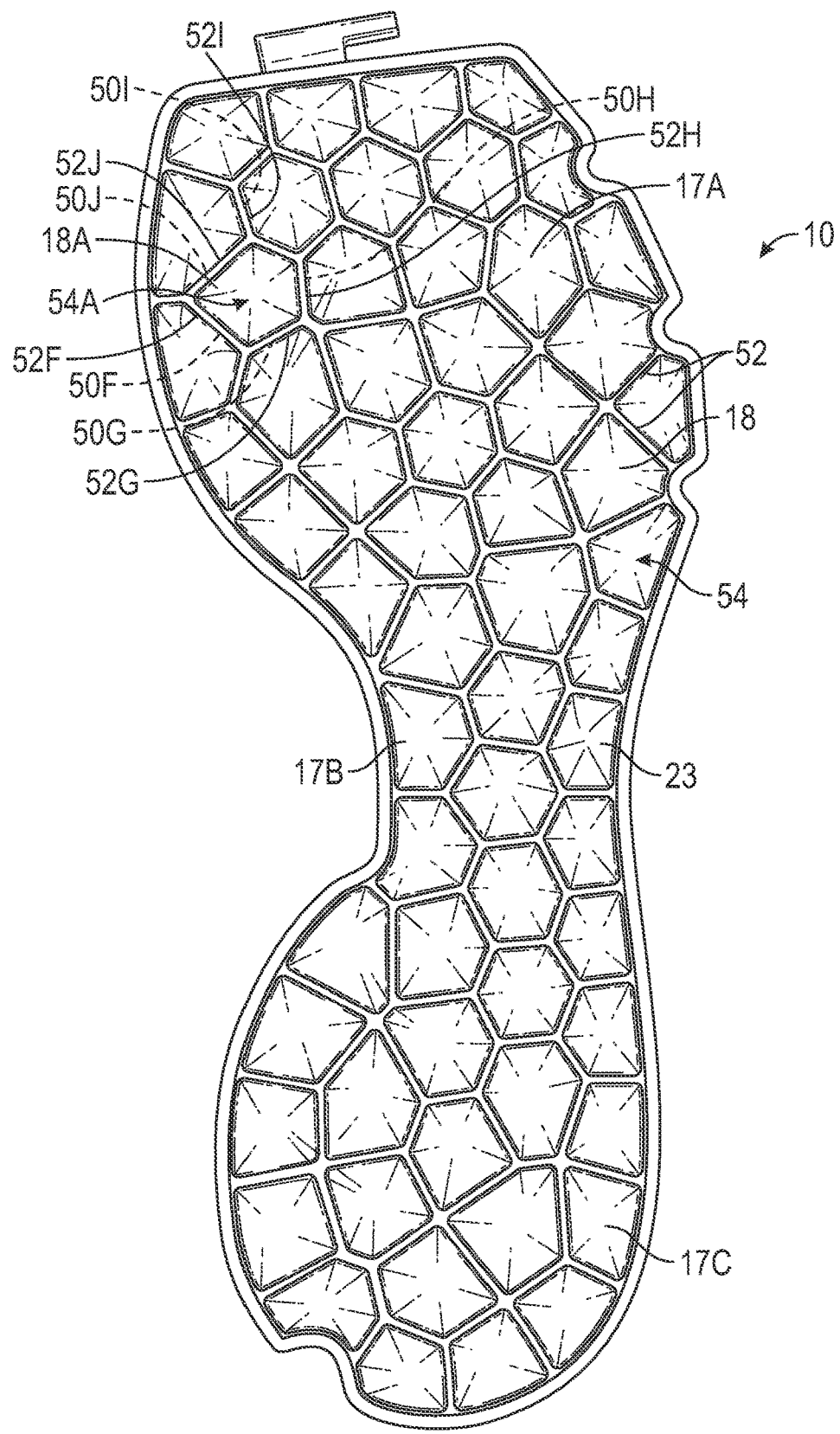
FIG. 2 is a schematic illustration in bottom view of the cushioning article of FIG. 1.

Referring to FIGS. 1-3, the cushioning article 10 includes a bladder 23 having a first polymeric sheet 16 and a second polymeric sheet 18 bonded to one another at a peripheral bond 20 to enclose an interior cavity 22. When the sheets 16, 18 are bonded together at the peripheral bond 20 and any inflation port 82 is sealed, the first polymeric sheet 16 and the second polymeric sheet 18 retain a fluid in the interior cavity 22. As used herein, a "fluid" filling the interior cavity 22 may be a gas, such as air, nitrogen, another gas, or a combination thereof.

The first and second polymeric sheets 16, 18 can be a variety of polymeric materials that can resiliently retain a fluid such as nitrogen, air, or another gas. Examples of polymeric materials for the first and second polymeric sheets 16, 18 include thermoplastic urethane, polyurethane, polyester, polyester polyurethane, and polyether polyurethane. Moreover, the first and second polymeric sheets 16, 18 can each be formed of layers of different materials including polymeric materials. In one embodiment, each of the first and second polymeric sheets 16, 18 is formed from thin films having one or more thermoplastic polyurethane layers with one or more barrier layers of a copolymer of ethylene and vinyl alcohol (EVOH) that is impermeable to the pressurized fluid contained therein such as a flexible microlayer membrane that includes alternating layers of a gas barrier material and an elastomeric material, as disclosed in U.S. Pat. Nos. 6,082,025 and 6,127,026 to Bonk et al. which are incorporated by reference in their entireties. Alternatively, the layers may include ethylene-vinyl alcohol copolymer, thermoplastic polyurethane, and a regrind material of the ethylene-vinyl alcohol copolymer and thermoplastic polyurethane. Additional suitable materials for the first and second polymeric sheets 16, 18 are disclosed in U.S. Pat. Nos. 4,183,156 and 4,219,945 to Rudy which are incorporated by reference in their entireties. Further suitable materials for the first and second polymeric sheets 16, 18 include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340, 6,203,868, and 6,321, 465 to Bonk et al. which are incorporated by reference in their entireties. In selecting materials for the cushioning article 10, engineering properties such as tensile strength, stretch properties, fatigue characteristics, dynamic modulus, and loss tangent can be considered. For example, the thicknesses of the first and second polymeric sheets 16, 18 used to form the cushioning article 10 can be selected to provide these characteristics.

As best shown in FIG. 3, the cushioning article 10 includes a tensile component 30 disposed in the interior cavity 22. The tensile component 30 includes a first tensile layer 32, a second tensile layer 34, and a plurality of tethers 36 spanning the interior cavity 22 from the first tensile layer 32 to the second tensile layer 34. The tethers 36 connect the first tensile layer 32 to the second tensile layer 34. Only some of the tethers 36 are indicated with reference numbers in FIG. 3. The tethers 36 may also be referred to as fabric tensile members or threads, and may be in the form of drop threads that connect the first tensile layer 32 and the second tensile layer 34. The tensile component 30 may be formed as a unitary, one-piece textile element having a spacer-knit textile. It should be appreciated that the first tensile layer 32 and the second tensile layer 34 are permeable by the gas in the interior cavity. As such, the interior cavity 22 extends through the first tensile layer 32 and the second tensile layer 34, in between and around the tethers 36, from the inner surface of the first polymeric sheet 16 to the inner surface of the second polymeric sheet 18. The tensile layers 32, 34 are not subjected to outward forces by the gas in the interior cavity where the tensile layers are not bonded to the first and second polymeric sheets 16, 18. Accordingly, tethers 36B that extend between the portions of the tensile layer 32, 34 that are not bonded to the polymeric sheets 16, 18 (e.g., the portions of the tensile layers 32, 34 that are inward of the domed portions) may not be in tension. However, tethers 36A that extend between the portions of the tensile layers 32, 34 bonded to the polymeric sheets 16, 18 (e.g., at inwardly-protruding bonds 50) are subjected to tension under a sufficiently inflation pressure of the interior cavity 22.

Figure 15:
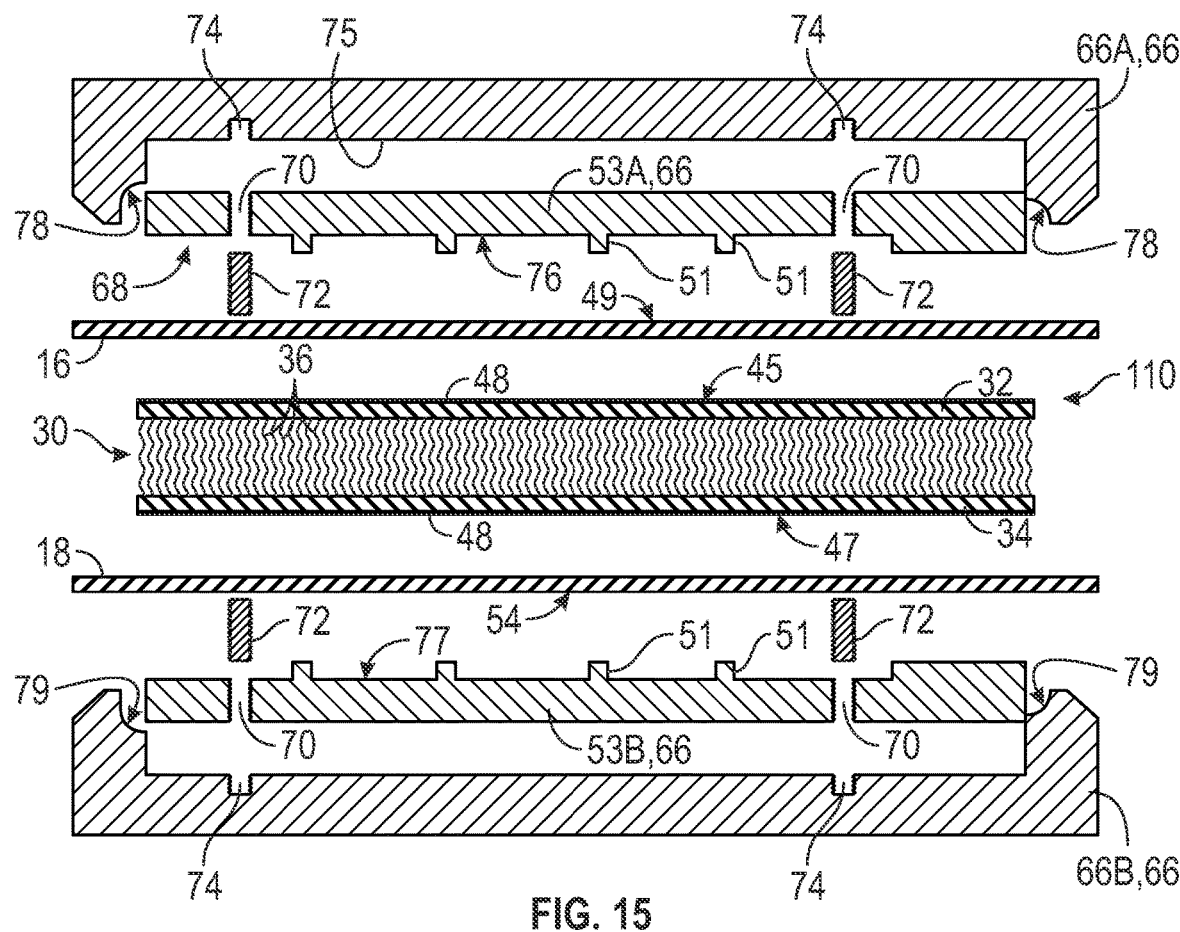
FIG. 15 is a schematic illustration in exploded cross-sectional view of components of the cushioning article of FIG. 1 and a mold used in manufacturing the cushioning article.

Anti-weld material 48 is applied to selected areas of the outer surfaces 45, 47, respectively, of the first and second tensile layers 32, 34 as best shown in FIG. 15. For example, anti-weld material may be ink jet printed everywhere except at areas where protrusions of mold components used during thermoforming of the cushioning article 10 cause inwardly-protruding bonds 50 of the first polymeric sheet 16 and the second polymeric sheet 18, as further explained herein. The inwardly-protruding bonds 50 of the first polymeric sheet 16 are also referred to as a first plurality of bonds. Alternatively, anti-weld material may be applied even where the bonds 50 are desired, if the anti-weld material is not activated. The anti-weld material 48, if activated, prevents the inner surfaces 42, 46 of the first and second polymeric sheets 16, 18 from bonding to the outer surfaces 45, 47 of the tensile component 30 during the manufacturing method 210 described herein. The first tensile layer 32 is bonded to an inner surface 42 of the first polymeric sheet 16 at the inwardly-protruding bonds 50. The second tensile layer 34 is bonded to an inner surface 46 of the second polymeric sheet 18 at inwardly-protruding bonds 50 as best shown in FIG. 3. The inwardly-protruding bonds 50 of the second polymeric sheet 18 are also referred to as a second plurality of bonds. The first plurality of bonds 50 are in a first region of the bladder 23 (e.g., on the proximal side in each of the forefoot, midfoot, and heel regions), and the second plurality of bonds 50 are in a second region of the bladder 23 (e.g., on the distal side in each of the forefoot, midfoot, and heel regions).

The tethers 36 restrain separation of the first and second polymeric sheets 16, 18 to the maximum separated positions shown in FIG. 3 under a given inflation pressure of gas in the interior cavity 22. The outward force of pressurized gas in the interior cavity 22 on the inner surfaces 42, 46 of the first and second polymeric sheets 16, 18 places the tethers 36A at the inwardly-protruding bonds 50 in tension, and the tethers 36 prevent the tensile layers 32, 34 and polymeric sheets 16, 18 from further outward movement away from one another. However, the tethers 36 do not present resistance to compression when under a compressive load. When pressure is exerted on the cushioning article 10 such as due to a force of a dynamic impact of a wearer during running or other movements, the cushioning article 10 is compressed, and the polymeric sheets 16, 18 move closer together with the tethers 36 collapsing (i.e., going slack) in proportion to the pressure exerted on the first and second polymeric sheets 16, 18 adjacent the particular tethers 36.

Prior to bonding to the first and second polymeric sheets 16, 18 according to the method 210 disclosed herein, the tethers 36 of the tensile component 30 may all be initial lengths, and possibly all substantially the same length, and the first and second tensile layers 32, 34 connected by the tethers 36 may have generally flat outer surfaces 45, 47, respectively, directly above the tethers 36 as shown in FIG. 15. In FIG. 15, the tethers 36 are represented in a slackened state as FIG. 15 represents the tensile component 30 prior to securement within a sealed, pressurized interior cavity 22.

Under the method 210 provided herein, although the tethers 36 are originally of the same length and the outer surfaces 45, 47 of the first and second tensile layers 32, 34 and the outer surfaces 49, 54 of the first and second polymeric sheets 16, 18, respectively, are generally flat directly above the tethers 36 (i.e., not contoured) prior to manufacture of the cushioning article 10, the method of manufacturing 210 produces inwardly-protruding bonds 50 that join the first polymeric sheet 16 to the first tensile layer 32 that protrude from the first polymeric sheet 16 toward the second polymeric sheet 18 directly into a region of the cavity 22 occupied by some of the tethers 36. In fact, in FIG. 3, there are multiple inwardly-protruding bonds 50.

Figure 18:
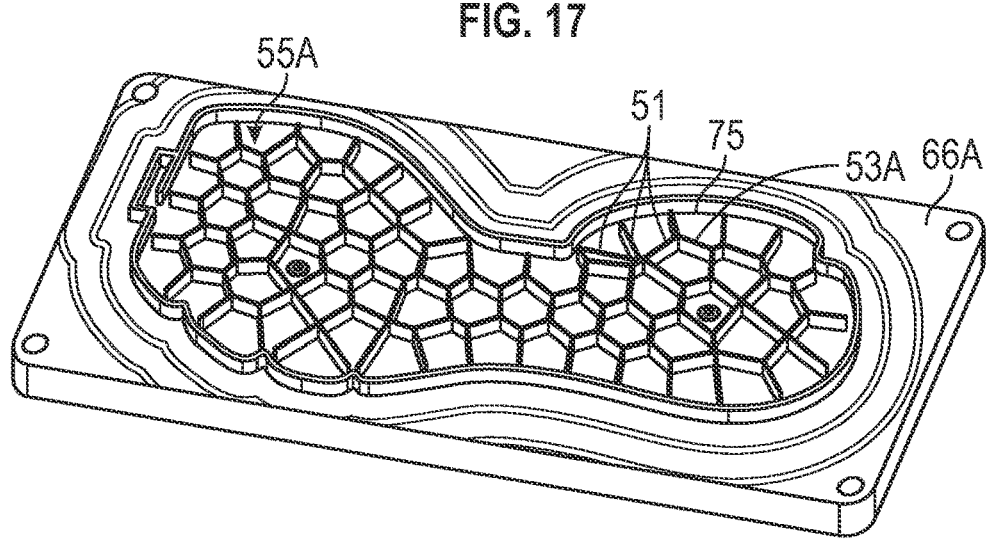
FIG. 18 is a schematic perspective illustration of the mold portion of FIG. 17 with a first mold insert secured to the mold portion.

Each bond 50 in the first polymeric sheet 16 results from a respective protrusion 51 of a mold component 53A (best shown in FIGS. 15 and 18 as a plurality of protrusions 51 arranged in closed shapes) that contacts the first polymeric sheet 16 during the method of manufacturing 210 disclosed herein. Each bond 50 in the second polymeric sheet 18 results from a respective protrusion 51 of a mold component 53B (also shown as a plurality of protrusions 51 arranged in closed shapes) that contacts the second polymeric sheet 18 during the method of manufacturing 210 disclosed herein (see FIG. 15). FIG. 18 shows a representative mold component 53A having the protrusions 51 in a first pattern that result in the bond pattern 55A of inwardly-protruding bonds 50 of the cushioning article 10 shown in FIG. 1. The mold component 53B is identical to mold component 53A, and results in the same bond pattern 55A on the second polymeric sheet 18. The mold component 53A is a first mold insert, and may also be referred to as a shim. The mold component 53B is a second mold insert. The bonds 50 are indicated with hidden lines in FIGS. 1 and 2 as they protrude inward from the outer surfaces 49, 54 shown.

The bonds 50 result in depressed grooves 52 at the outer surface 49 of the first polymeric sheet 16 and at the outer surface 54 of the second polymeric sheet 18. Only some of the bonds 50 and some of the grooves 52 are indicated in FIGS. 1 and 2 for clarity. As best shown in FIGS. 1 and 2, the inwardly-protruding bonds 50 on the first polymeric sheet 16 define closed shapes surrounding portions of the first polymeric sheet 16. The inwardly-protruding bonds 50 on the second polymeric sheet 18 define closed shapes surrounding portions of the second polymeric sheet 18. In the embodiment shown, the closed shapes are polygons. For example, one closed shape is a pentagon, and is indicated in FIG. 1 by numbering the bonds 50 that surround and define the closed shape as bonds 50A, 50B, 50C, 50D, and 50E. The corresponding grooves 52 are numbered as 52A, 52B, 52C, 52D, and 52E.

Due to the pressure of the gas in the interior cavity 22, a portion 16A of the first polymeric sheet 16 that is not bonded to the first tensile layer 32 (i.e., unbonded) and is surrounded by the bonds 50A, 50B, 50C, 50D, 50E defining the closed shape is displaced from the first tensile layer 32 (i.e., lifted away from the first tensile layer) such that the portion 16A of the first polymeric sheet 16 has a domed surface 49A extending away from the first tensile layer 32. The closed shape and domed surface 49A indicated is only one of many closed shapes and resulting domes surfaces at the outer surface 49 of the first polymeric sheet 16. Additional portions with domed surfaces 49B, 49C, 49D, 49E are indicated in FIG. 3 and may be referred to as domed portions. As is apparent from the plan view of FIG. 1, the first polymeric sheet 16 effectively has a multitude of rounded bubble-like shapes extending over each of the forefoot region 17A, the midfoot region 17B, and the heel region 17C of the cushioning article 10. As used herein, "domed" means rounded, and need not be hemispherical.

Similarly, with reference to FIG. 2, one closed shape at the second polymeric sheet 18 is a pentagon, indicated in FIG. 2 by numbering the bonds 50 that surround and define the closed shape as bonds 50F, 50G, 50H, 50I, and 50J. The corresponding grooves 52 are numbered as 52F, 52G, 52H, 52I, and 52J. Due to the pressure of the gas in the interior cavity 22, a portion 18A of the second polymeric sheet 18 surrounded by the bonds 50F, 50G, 50H, 50I, 50J defining the closed shape is displaced from the second tensile layer 34 such that the portion 18A of the second polymeric sheet 18 has a domed surface 54A extending away from the second tensile layer 34 as best shown in FIG. 3. The closed shape and portion of second polymeric sheet 18 with a domed surface 54A indicated is only one of many closed shapes and resulting portions with domes surfaces at the outer surface 54 of the second polymeric sheet 18. Additional portions with domed surfaces 54B, 54C, 54D, 54E are indicated in FIG. 3. As is apparent from the bottom view of FIG. 2, the second polymeric sheet 18 effectively has a multitude of rounded, bubble-like shapes extending over each of the forefoot region 17A, the midfoot region 17B, and the heel region 17C of the cushioning article 10.

Each inwardly-protruding bond 50 partially traverses the plurality of tethers 36 as shown in FIG. 3. Stated differently, the bonds 50 are directly outward of different ones of the tethers 36 and protrude inward on those tethers 36. The tethers 36 may be arranged in rows, with each row extending transversely between the tensile layers 32, 34, or in any other pattern in which the tethers 36 extend between the tensile layers 32, 34. Various different ones of the tethers 36 are aligned with the bonds 50. An inwardly-protruding bond 50 may traverse different rows of the tethers 36 such that different tethers from different rows are aligned with an inwardly-protruding bond 50, or an inwardly-protruding bond 50 may be directly aligned with a single row. Some of the inwardly-protruding bonds 50 could be between rows of tethers.

With reference to FIG. 4, the plurality of tethers 36 includes tethers 36A aligned with the inwardly-protruding bonds 50 and tethers 36B displaced from the inwardly-protruding bonds 50. Tethers 36A that are aligned with an inwardly-protruding bonds 50 are deformed by heat, by compression of the overlaying materials of the first tensile layer 32 and the second tensile layer 34, and/or by the overlaying material of the first tensile layer 32 and/or the second tensile layer 34 coating the tethers 36A such that the tethers 36A are shorter, thicker, or both shorter and thicker at the inwardly-protruding bonds 50 than elsewhere. Such tethers are indicated with reference numeral 36A in FIG. 4 and may be referred to as modified tethers 36A. However, references to tethers 36 herein include tethers 36A and tethers 36B unless otherwise specified.

When the interior cavity 22 is inflated, the modified tethers 36A result in depressed grooves 52 in the outer surface 49 of the first polymeric sheet 16, as indicated in FIG. 3. When an inflation pressure of the gas in the interior cavity 22 against the inner surfaces of the polymeric sheets 16, 18 is sufficient to cause the polymeric sheets 16, 18 to tension the tethers 36A, the inwardly-protruding bonds 50 define the grooves 52 at the outer surface 49 of the first polymeric sheet 16 and in the outer surface 54 of the second polymeric sheet 18. At each groove 52, the cushioning article 10 is divided into what may be referred to as a first article portion 61 on one side of the groove 52 and a second article portion 62 on the other side of the groove 52, as indicated in FIG. 4 with respect to the left-most groove 52 indicated. The first article portion 61 is articulated relative to the second article portion 62 along the groove 52. Stated differently, the outer surface 49 of the first polymeric sheet 16 at a first side of the inwardly-protruding bond 50 (the first side indicated in FIG. 4 as portion 49D of outer surface 49) is non-planar with the outer surface 49 of the first polymeric sheet 16 at a second side of the inwardly-protruding bond 50 (the second side indicated in FIG. 4 as portion 49C of outer surface 49), with the second side opposite of the first side. The outer surface 54 of the second polymeric sheet 18 at a first side of the inwardly-protruding bond 50 (the first side indicated in FIG. 4 as portion 54D of outer surface 54) is non-planar with the outer surface 54 of the second polymeric sheet 18 at a second side of the inwardly-protruding bond 50 (the second side indicated in FIG. 4 as portion 54C of outer surface 54), with the second side opposite of the first side.

The grooves 52 may act as flexion axes of the cushioning article 10. For example, when the cushioning article 10 is included in the sole structure 12 of the article of footwear 14 in FIG. 9, the inwardly-protruding bonds 50 and resulting grooves 52 may establish flexion axes of the sole structure 12. The bonds 50 may be configured so that many of the bonds 50 fall lengthwise near or along a common axis to establish flexion axes that may align with joints of the foot, such as the metatarsal phalangeal joints, thereby increasing flexibility of the sole structure 12. Various flexion axes F1, F2 are indicated in FIG. 1. Flexion axes increase flexibility of the cushioning article 10. In some embodiments, some of the bonds 50 may be aligned in a straight line from the medial side to the lateral side of the cushioning article, creating a flexion axis that extends transversely across the entire cushioning article.

Referring to FIGS. 3 and 4, each inwardly-protruding bond 50 at the first polymeric sheet 16 is spaced apart from the second polymeric sheet 18, and each inwardly-protruding bond 50 at the second polymeric sheet 18 is spaced apart from the first polymeric sheet 16 such that the interior cavity 22 is narrowed but not closed at the inwardly-protruding bonds 50. Gas in the interior cavity 22 can thus fluidly communicate across any of the inwardly-protruding bonds 50 (i.e., between a bond 50 on the first polymeric sheet 16 and a corresponding bond 50 on the second polymeric sheet 18). As shown in FIG. 4, the first tensile layer 32 is spaced apart from the second tensile layer 34 by a first distance D1 at a location adjacent to the inwardly-protruding bond 50, and the inwardly-protruding bond 50 at the first polymeric sheet 16 and the first tensile layer 32 is spaced apart from the inwardly-protruding bond 50 at the second polymeric sheet 18 and the second tensile layer 34 by a second distance D2. The first distance D1 may be the distance between the tensile layers 32, 34 at the tethers 36B that are not the modified tethers 36A. The second distance D2 may be the minimum distance between the corresponding inwardly-protruding bonds 50 at the modified tethers 36A (i.e., the distance at the most narrowed portion of the interior cavity 22 between corresponding bonds 50 of the first and second polymeric sheets 16, 18). In an embodiment, the method of manufacturing 210 may be controlled so that the second distance D2 is between 50 percent and 80 percent of the first distance D1. Bonds 50 in this range of depth may create the most desirable amount of articulation. For example, factors that may influence the bond 50 and the extent of its protrusion toward the opposite first or second polymeric sheet 16, 18 can be controlled to provide this desired ratio of the second distance D2 to the first distance D1. Such factors may include the depth of the protrusion 51 that creates the bond 50, the temperature of the mold insert 53 or other mold components, the temperature of the components of the cushioning article 10, vacuum and/or inflation pressures in the mold cavity during manufacturing, the power of weld frequency if radio frequency welding is used, and other factors.

Accordingly, a portion 22A of the interior cavity 22 at a first side of corresponding inwardly-protruding bonds 50 is in fluid communication with a portion 22B of the interior cavity 22 at a second side of the corresponding inwardly-protruding bonds 50, with the second side opposite of the first side, as indicated in FIG. 4. The modified tethers 36A shown extending under the corresponding bonds 50 between the two portions 22A, 22B are narrow in diameter and allow gas to flow around and between the tethers 36A from the portion 22A to the portion 22B and vice versa. This allows the gas to be displaced from the portion 22A to the portion 22B and from portion 22B to portion 22A when compressive forces are applied to the cushioning article 10, such as during impact of the article of footwear 14 with the ground G in FIG. 9. For example, as a foot rolls forward from heel to toe during a foot strike, the gas may be displaced from rearward in the cushioning article 10 to a portion more forward in the cushioning article 10. Supportive cushioning provided by the interior cavity 22 can thus be provided in areas most needed during use of the cushioning article 10.

Figure 5:
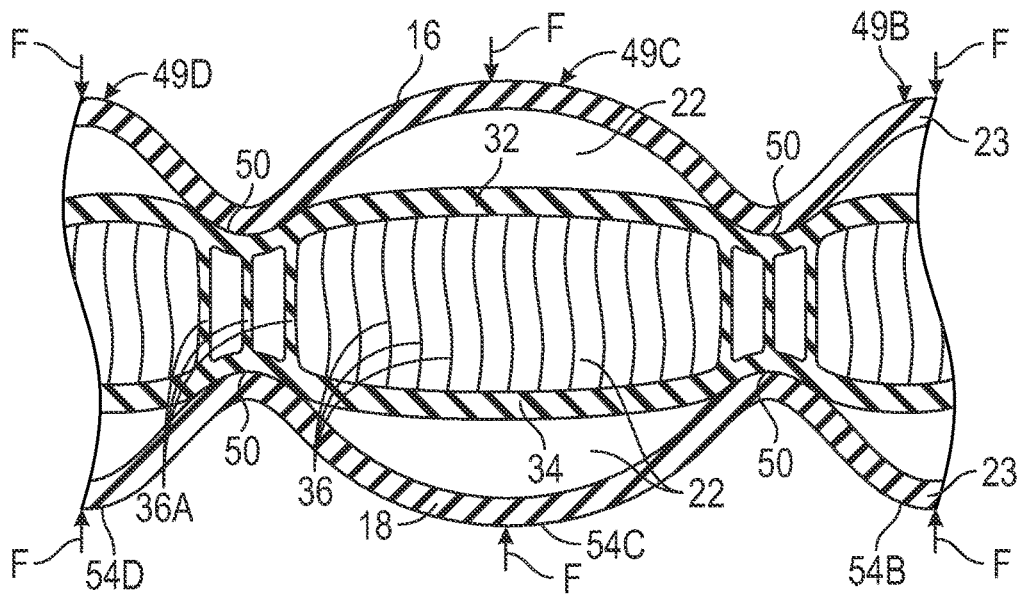
FIG. 5 is a schematic illustration in close-up cross-sectional view of the cushioning article of FIG. 4 under loading in a first stage of compression.
Figure 6:
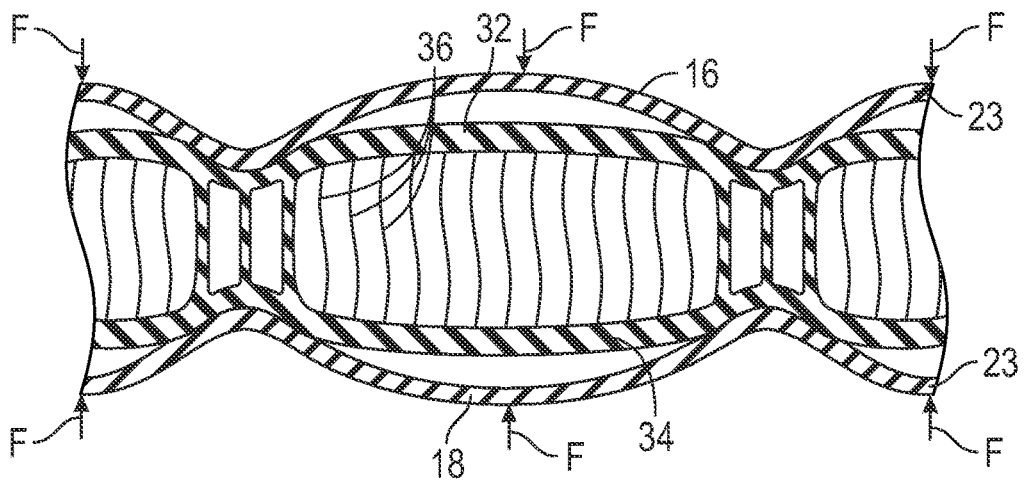
FIG. 6 is a schematic illustration in close-up cross-sectional view of the cushioning article of FIG. 4 under loading in a second stage of compression.
Figure 7:
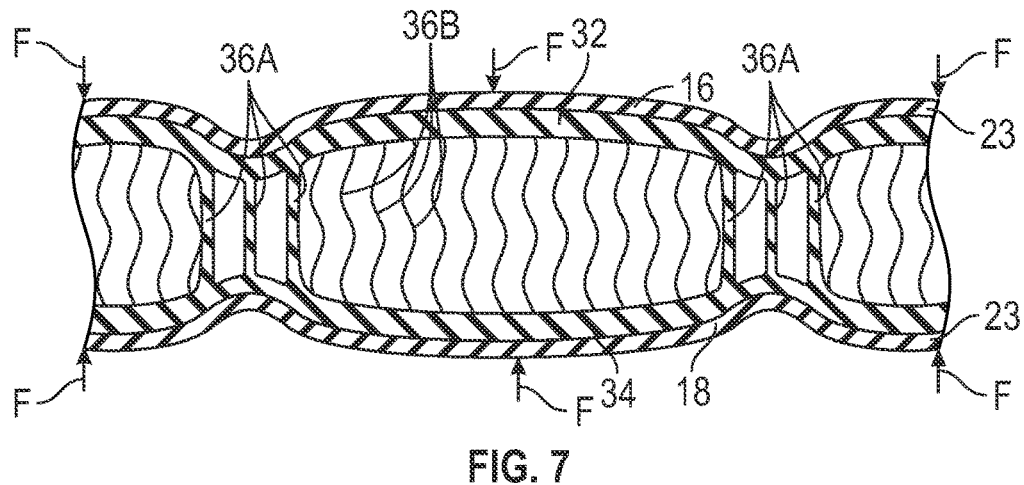
FIG. 7 is a schematic illustration in close-up cross-sectional view of the cushioning article of FIG. 4 under loading in a third stage of compression.
Figure 8:
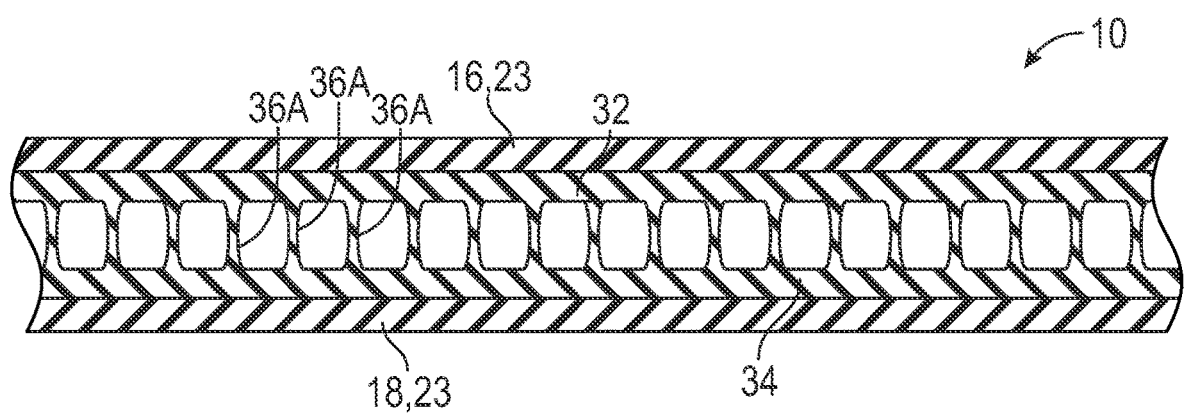
FIG. 8 is a schematic illustration in cross-sectional view of the cushioning article of FIG. 1, taken at lines 8-8 in FIG. 1.

FIGS. 5-7 show stages of compression of the cushioning article 10 under compressive force F applied normal to the domed surfaces of the first and second polymeric sheets 16, 18, such as under dynamic compressive loading during a foot strike when the cushioning article is a sole component of the sole structure 12 of FIG. 9. During initial loading, the portions with domed surfaces 49B, 49C, 49D and 54B, 54C, 54D begin to flatten, and the gas in the interior cavity 22 becomes more pressurized as the volume of the cavity 22 decreases, as depicted by the changes to the cushioning article 10 from FIG. 5 to FIG. 6. Under continued loading, the domed surfaces may completely flatten, and the first and second polymeric sheets 16, 18 contact the first and second tensile components 32, 34 between the bonds 50. With even further loading the shortened tethers 36A will collapse. When the dynamic compressive forces F are removed, the tethers 36A will return to a tensioned state, and the portions of the first and second polymeric sheets 16, 18 between the closed shapes of the bonds 50 will return to their domed shapes.

Figure 10:
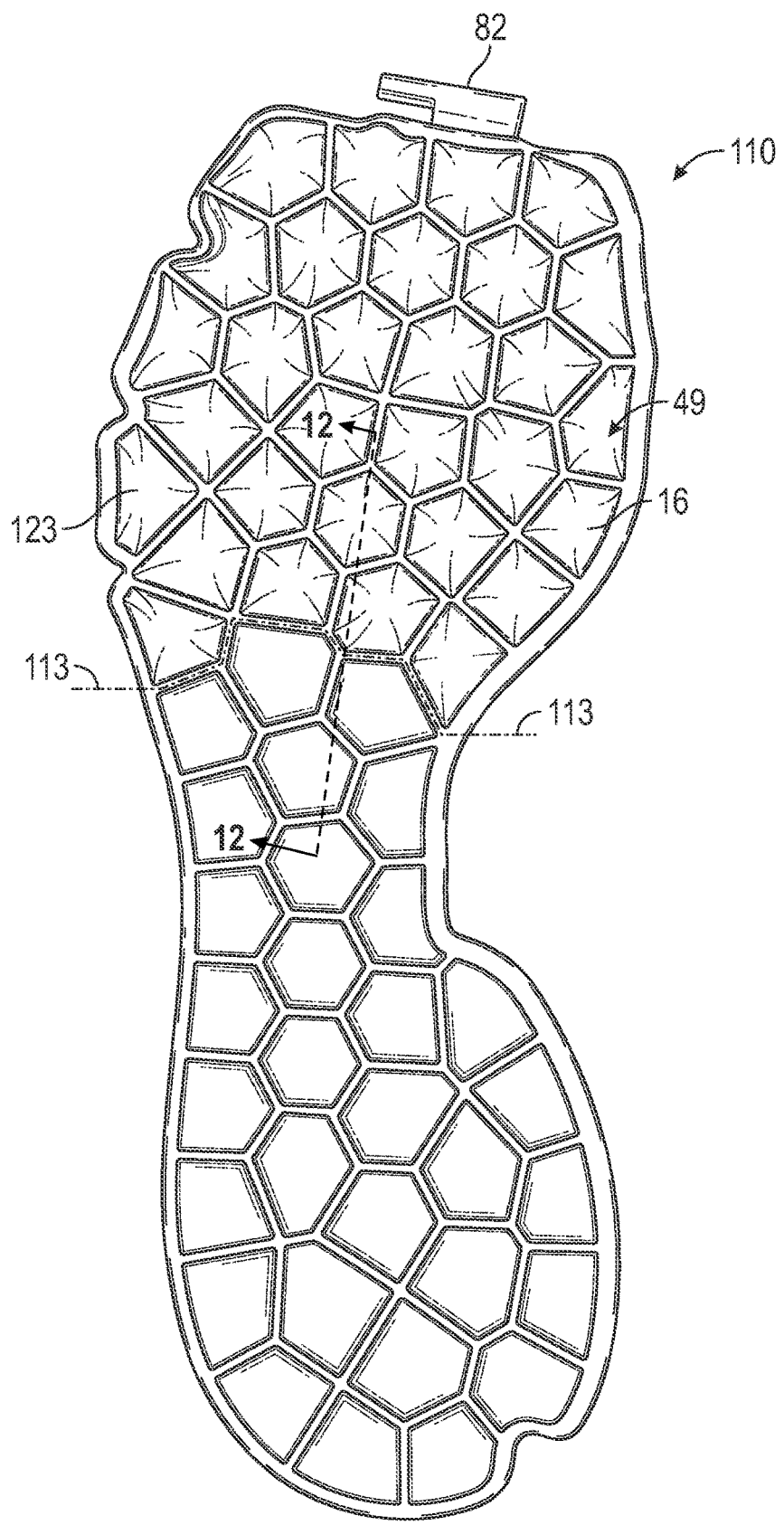
FIG. 10 is a schematic illustration in plan view of a cushioning article in accordance with an alternative aspect of the present teachings.
Figure 11:
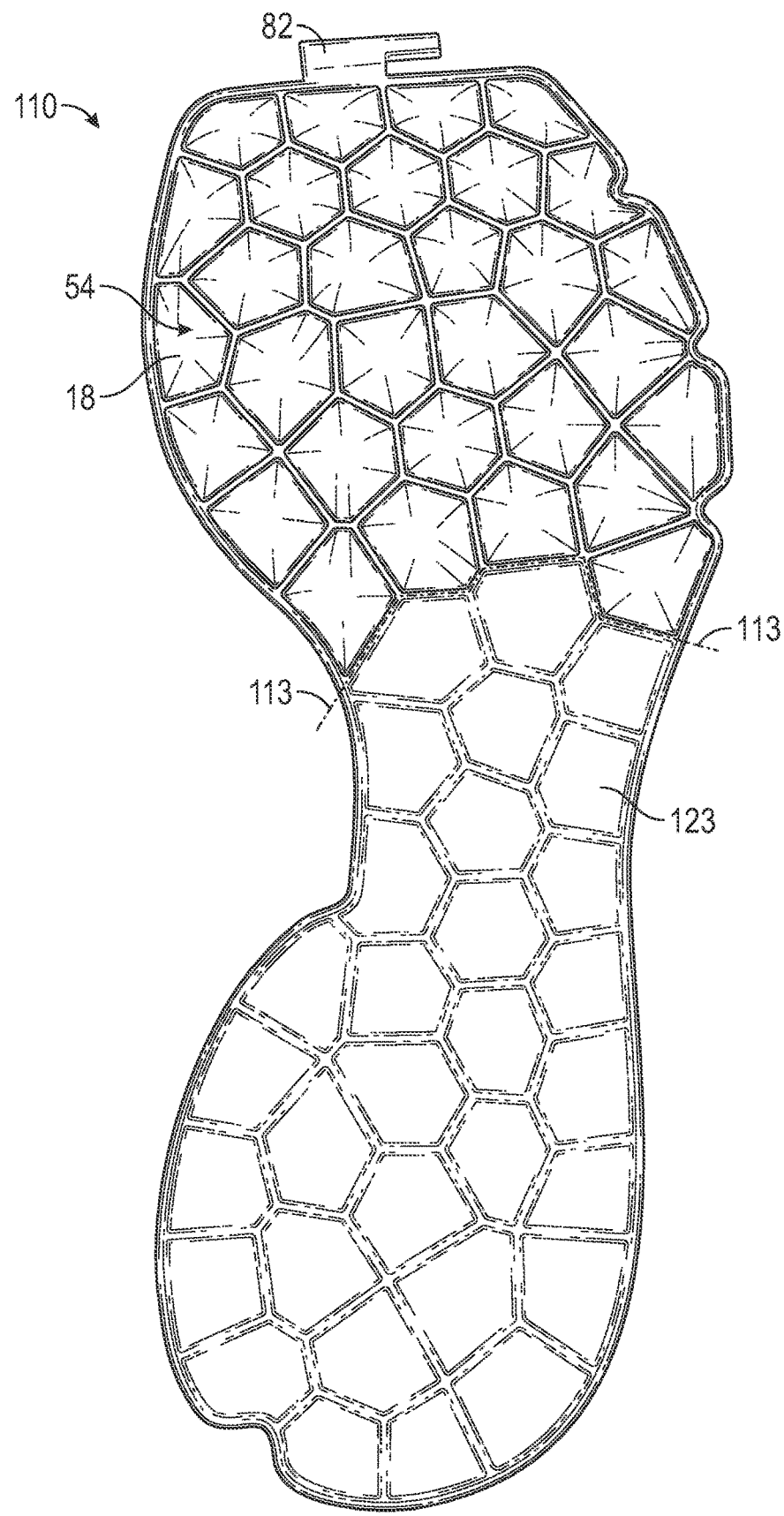
FIG. 11 is a schematic illustration in bottom view of the cushioning article of FIG. 10.
Figure 12:
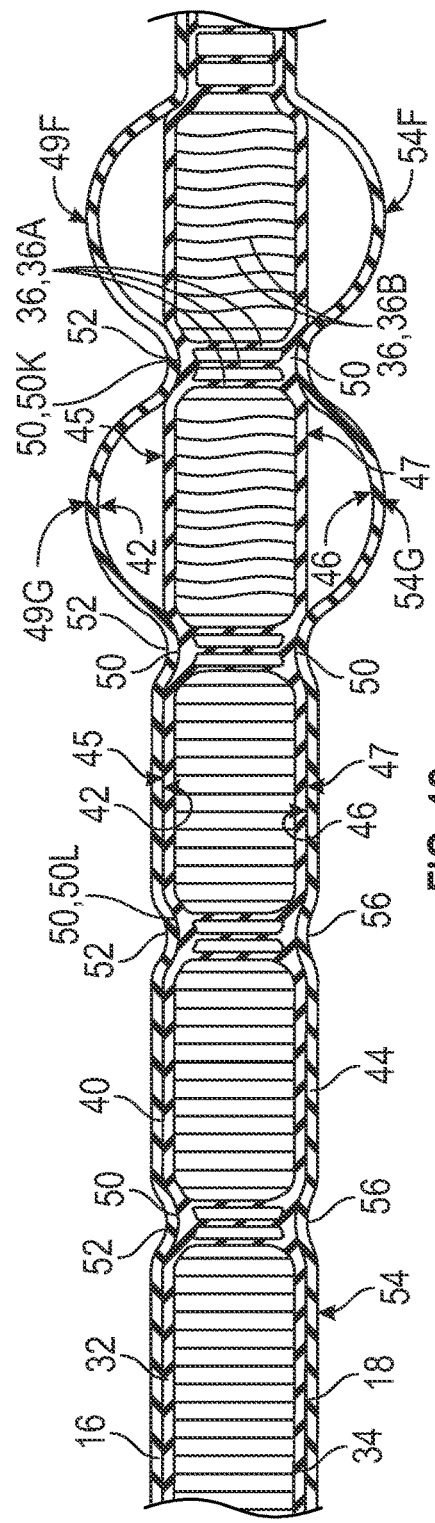
FIG. 12 is a schematic illustration in fragmentary cross-sectional view of the cushioning article of FIG. 10, taken at lines 12-12 in FIG. 10.
Figure 13:
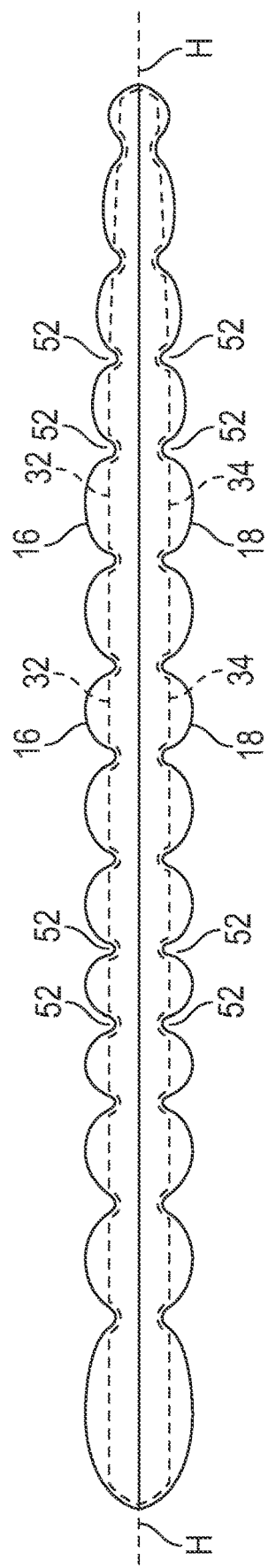
FIG. 13 is a schematic illustration in medial side view of the cushioning article of FIG. 1.
Figure 14:
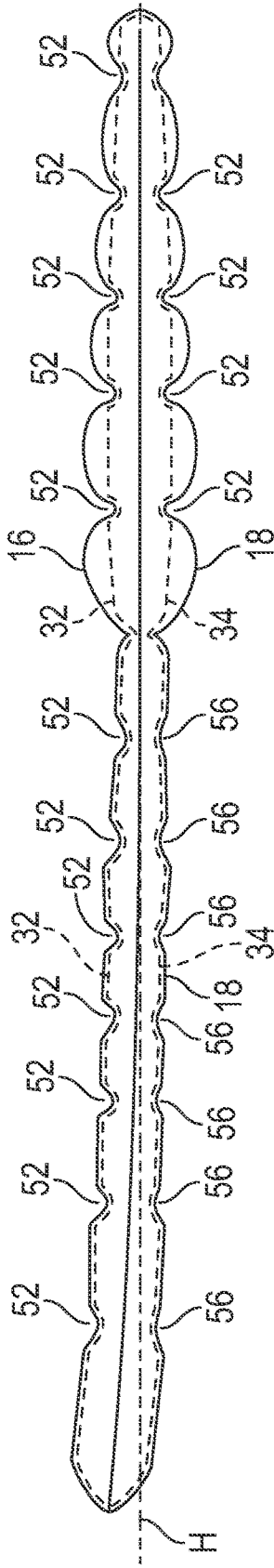
FIG. 14 is a schematic illustration in medial side view of the cushioning article of FIG. 10.

FIGS. 10-11 show another embodiment of a cushioning article 110. The cushioning article 110 has many of the same features as cushioning article 10, and these are shown with like reference numbers and are as described with respect to the cushioning article 10. The sheets 16, 18 form a bladder 123, with the first polymeric sheet establishing the proximal side of the bladder 123 and the second polymeric sheet 18 establishing the distal side of the bladder 123. In the cushioning article 110, anti-weld material is applied only forward of a representative dividing line 113 on the first and second polymeric sheets 16, 18 and/or on the tensile layers 32, 34 where bonding is not desired. Accordingly, as indicated in FIGS. 12 and 14, the first and second polymeric sheets 16, 18 have portions with inner surfaces 42, 46 that are surrounded by a first plurality of bonds 50 arranged in closed shapes, and are displaced from the outer surfaces 45, 47 of the adjacent first and second tensile layers 32, 34, respectively, forming the domed surfaces 49F, 49G, 54F, 54G, etc., only in a first region of the first polymeric sheet 16, which is the region forward of the dividing line 113.

In a second region of the first polymeric sheet 16, which is a region rearward of the dividing line 113 in FIGS. 10, 11, 12, and 14, the inner surface 42 of the first polymeric sheet 16 is bonded to an outer surface 45 of the first tensile layer 32 at surface bonds 40, and the inner surface 46 of the second polymeric sheet 18 is bonded to the outer surface 47 of the second tensile layer 34 at surface bonds 44. A mold is used so that protrusions 51 contact the only first polymeric sheet 16 in the second region. A second plurality of inwardly-protruding bonds 50 arranged in closed shapes are formed at the first polymeric sheet 16 in the second region, but not in the second polymeric sheet 18 in the second region. When the interior cavity 22 is inflated, the modified tethers 36A result in depressed grooves 52 in the outer surface 49 of the first polymeric sheet 16 and in the outer surface 54 of the second polymeric sheet 18 at the inwardly-protruding bonds 50. When an inflation pressure of the gas in the interior cavity 22 is sufficient to tension the plurality of tethers 36A at the inwardly-protruding bonds 50, the inwardly-protruding bonds 50 define grooves 52 at the outer surface 49 of the first polymeric sheet 16 and at the outer surface 54 of the second polymeric sheet 18. Although the first and the second pluralities of bonds 50 are shown on the first polymeric sheet 16 on the proximal side, the cushioning article 110 could be used in an article of footwear with the first polymeric sheet on the distal side.

The tension of the modified tethers 36A also causes recesses 56 in the outer surface 54 of the second polymeric sheet 18 opposite each of the inwardly-protruding bonds 50 of the first polymeric sheet 16. The second polymeric sheet 18 is recessed inward toward a corresponding groove 52 and inwardly-protruding bond 50 at each recess 56 when the interior cavity 22 is inflated. The grooves 52 are generally deeper than the recesses 56, which may cause the cushioning article 10 to be articulated in the second region even when not under a compressive load, as the cushioning article 10 curves slightly upward at each groove 52. Stated differently, the physical deformation of the first polymeric sheet 16 and the first tensile layer 32 combined with the tension of the modified tethers 36A will cause the grooves 52 to be deeper than the recesses 56, which result only from the tension of the shortened modified tethers 36A. Accordingly, the second region of the cushioning article 10 may have an articulated shape, such as when not under loading at the grooves 52, as shown in FIG. 14, where the second region is slightly curved upward from the horizontal line H. Additionally, the grooves 52 and recesses 56 together encourage articulation of the cushioning article 10 to occur at the grooves 52, as the overall thickness of the cushioning article 10 is reduced at the grooves 52, decreasing bending stiffness of the cushioning article at the grooves 52. In contrast, the cushioning article 10 that has grooves 52 on both sides due to inwardly-protruding bonds 50 at both the first and second polymeric sheets 16, 18 remains more level and less articulated than the cushioning article 110 when not under loading, but, like cushioning article 110, encourages articulation at the grooves 52.

Due to the surface bonds 40, any rounding or doming of the polymeric sheet 16 at the closed shapes surrounded by inwardly-protruding bonds 50 is lessened, and does not include any displacement of the first polymeric sheet 16 from the first tensile layer 32. In FIG. 14, the first and second tensile layers 32, 34 are indicated with hidden lines following the contours of the first and second polymeric sheets 16, 18 in the second region, and are intended to indicate that the inner surfaces 42, 46 are bonded to the outer surfaces 45, 47 in the entirety of the second region. As shown in FIG. 12, at a first inwardly-protruding bond 50K, the interior cavity 22 is narrowed but not closed, so gas can communicate across the bond 50K and the corresponding bond 50 of the second polymeric sheet 18. At a second inwardly-protruding bond 50L in the second region, the interior cavity 22 is narrowed but not closed, so gas can communicate across the bond 50L and a corresponding bond 50 of the second polymeric sheet 18.

Figure 16:
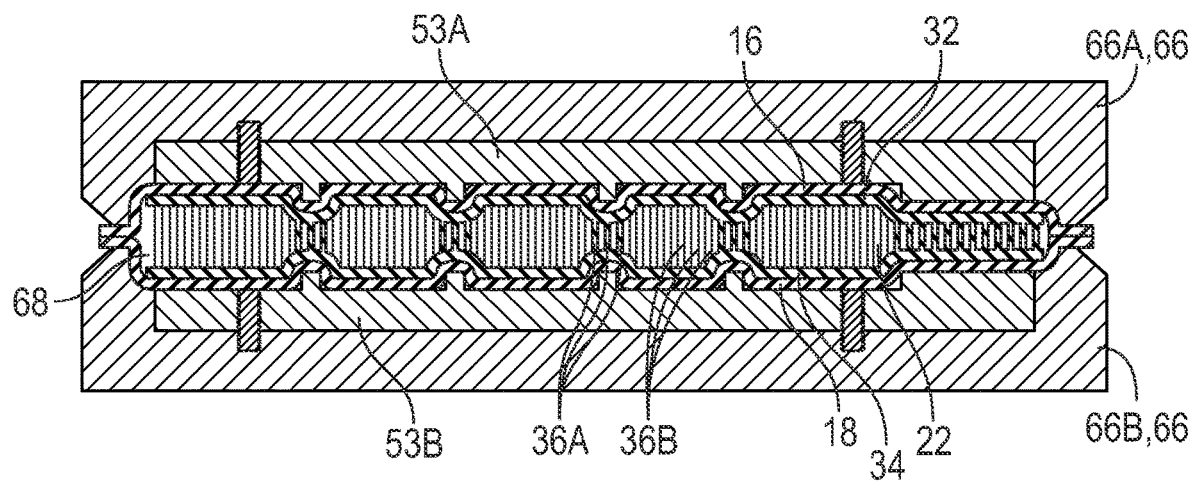
FIG. 16 is a schematic illustration of the components of the cushioning article of FIG. 1 in the mold of FIG. 16, with the mold in a closed position.
Figure 17:
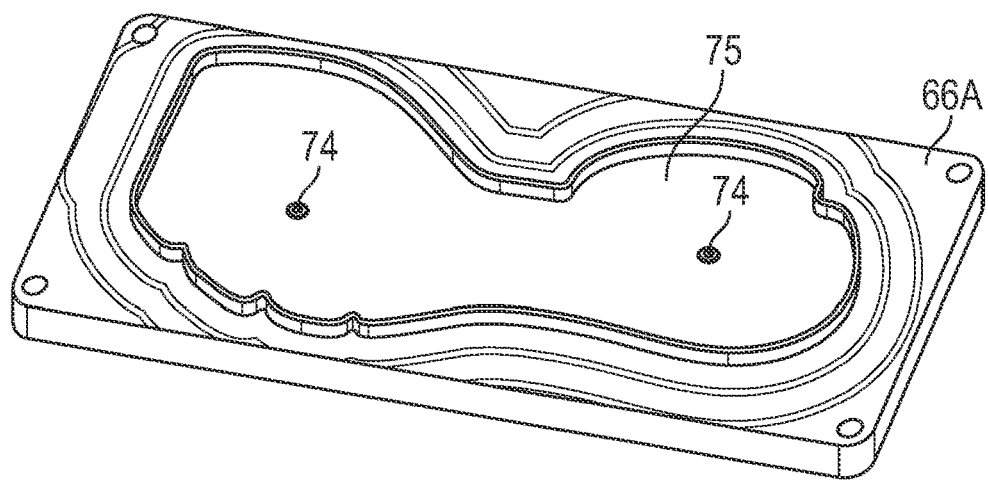
FIG. 17 is a schematic perspective illustration of a mold portion for manufacturing cushioning components.

FIG. 15 shows the components of the cushioning article 10 in an exploded view and positioned between components of a mold 66. More specifically, the components of mold 66 (also referred to herein as mold components) include a first mold portion 66A, a second mold portion 66B, a first mold insert 53A, and a second mold insert 53B. The components of the mold necessary to manufacture the cushioning article 110 are the same except that the second mold insert 53B would not have protrusions 51 as no inwardly-protruding bonds are created at the second polymeric sheet 18 in the cushioning article 110. Alternatively, the second mold portion 66B could be modified so that no mold insert is necessary, and the mold surface contacting the outer surface 54 of the second polymeric sheet 18 has no protrusions 51. FIG. 16 shows the components of the cushioning article 10 in a mold cavity 68 of the mold 66 defined by the mold components with the mold 66 in a closed position. Although the polymeric sheets 16, 18 are in contact with the tensile components 32, 34 in the mold 66, anti-weld material prevents bonding of the polymeric sheets 16, 18 to the tensile components 32, 34 where the anti-weld material is disposed.

FIGS. 21-24 show another embodiment of a cushioning article 310. The cushioning article 310 has many of the same features as cushioning articles 10 and 110, and these are shown with like reference numbers and are as described with respect to the cushioning article 310. In the cushioning article 310, anti-weld material is applied to the inner surfaces of only the second polymeric sheet 18 and/or on the tensile layer 34. Accordingly, as indicated in FIG. 23, the first polymeric sheet 16 is at a proximal side of the cushioning article 310 and has a plurality of bonds 50 (referred to as a second plurality of bonds) in a second region of the bladder 323 which is the entire forefoot region 17A, midfoot region 17B, and heel region 17C on a distal side of the bladder 323 (defining closed shapes, and portions surrounded by the closed shapes having surface bonds 40 to the first tensile layer 32. The second polymeric sheet 18 has portions with a first plurality of bonds 50 arranged in closed shapes surrounding portions with inner surfaces 46 that are displaced from the outer surface 47 of the adjacent second tensile layer 34, forming the domed surfaces 54F, 54G, 54H, 54I, 54J, etc., in a first region of the second polymeric sheet 18, which is the entire forefoot region 17A, midfoot region 17B, and heel region 17C on a distal side of the bladder 23.

In a second region of the first polymeric sheet 16, which is a region rearward of the dividing line 113 in FIGS. 10, 11, 12, and 14, the inner surface 42 of the first polymeric sheet 16 is bonded to an outer surface 45 of the first tensile layer 32 at surface bonds 40, and the inner surface 46 of the second polymeric sheet 18 is bonded to the outer surface 47 of the second tensile layer 34 at surface bonds 44. A mold is used so that protrusions 51 contact the only first polymeric sheet 16 in the second region. Inwardly-protruding bonds 50 are formed at the first polymeric sheet 16 in the second region, but not in the second polymeric sheet 18 in the second region. When the interior cavity 22 is inflated, the modified tethers 36A result in depressed grooves 52 in the outer surface 49 of the first polymeric sheet 16 and in the outer surface 54 of the second polymeric sheet 18 at the inwardly-protruding bonds 50. When an inflation pressure of the gas in the interior cavity 22 is sufficient to tension the plurality of tethers 36A at the inwardly-protruding bonds 50, the inwardly-protruding bonds 50 define grooves 52 at the outer surface 49 of the first polymeric sheet 16 and at the outer surface 54 of the second polymeric sheet 18.

A method 210 of manufacturing a cushioning article, such as cushioning article 10, 110, or 310 is shown in the flow chart of FIG. 20, and is described with reference to FIGS. 15 and 16. The method 210 may begin with block 211, disposing anti-weld material on the inner surface of the first polymeric sheet 16, or on the outer surface of the first tensile layer 32. In manufacturing the cushioning article 110, the anti-weld material would only be disposed forward of the dividing line 113, such as in the first region of the first polymeric sheet 16. In manufacturing the cushioning article 10, the method also includes block 212, disposing anti-weld material on the inner surface of the second polymeric sheet 18 or on the outer surface of the second tensile layer 34. In manufacturing cushioning article 110, block 212 may be omitted for some regions of the polymeric sheet 18 as discussed herein. In manufacturing cushioning article 310, block 211 may be omitted. The anti-weld material disposed in blocks 211 and 212 is not disposed in locations where bonds 50 are desired. For example, the anti-weld material may be disposed forward of dividing line 113 as described, but avoiding the areas of the sheets 16, 18 and the tensile layers 32, 34 where bonds are desired. The correct placement of anti-weld material to achieve this may be by ink-jet printing the correct pattern on the surfaces of the sheets 16, 18 and/or tensile layers. Alternatively, the anti-weld material may be disposed at locations where bonds are desired, if it is not activated at those locations.

In block 213, a first mold insert 53A with a first protrusion pattern 55A (i.e., the pattern of protrusions 51 arranged in closed shapes) is secured to the first mold portion 66A, as best shown in FIG. 18. For example, as indicated in FIG. 15, the first mold insert 53A has openings 70 that receive fasteners 72. The fasteners 72 extend into openings 74 in the first mold portion 66A to secure the first mold insert 53A to the first mold portion 66A. The openings 74 are in a recess 75 of the first mold portion 66A, and the mold insert 53A fits within the recess 75 so that the surface 76 is flush with adjacent surfaces 78 of the first mold portion 66A. The openings 70, 74 and the fasteners 72 may be threaded, for example. When disposed as set forth in block 212, the mold insert 53A is therefore in and partially defines the mold cavity 68.

When manufacturing the cushioning article 10 or 310, a second mold insert 53B having a plurality of protrusions 51 arranged in closed shapes will be secured to the second mold portion 66B in block 214 in the same manner as first mold insert 53A is secured to first mold portion 66A. For some configurations, the first and second mold portions 66A, 66B may be configured with the plurality of protrusions 51 arranged in closed shapes such that no mold inserts 53A, 53B need be used. However, the use of mold inserts 53A, 53B allows the same mold portions 66A, 66B to be used in manufacturing cushioning articles with different bond patterns simply by changing either or both mold inserts 53A, 53B for those with an alternative pattern of protrusions. When manufacturing the cushioning article 110, no protrusions are necessary adjacent the second polymeric sheet 18 rearward of line 113 as no inwardly-protruding bonds 50 are created in the second polymeric sheet 18 in this region. Accordingly, in manufacturing the cushioning article 110, the second mold portion 66B configured to align rearward of line 113 may be provided without protrusions and with a surface configured to shape the outer surface of the second polymeric sheet 18.

Next, in block 215, prior to disposing the components of the cushioning article 10 into the open mold cavity 68, the components of the cushioning article 10 (or cushioning article 110 or 310), the mold components 53A, 53B, 66A, 66B, or both, may be pre-heated to help expedite the subsequent thermoforming that occurs via the combined blocks 218, 220.

In block 216, the first and second polymeric sheets 16, 18 and the tensile component 30 are then disposed in the mold cavity 68, with the first tensile layer 32 positioned adjacent the first polymeric sheet 16, the second tensile layer 34 positioned adjacent the second polymeric sheet 18, and the plurality of tethers 36 connecting the first tensile layer to the second tensile layer. Block 216 may comprise placing first and second polymeric sheets 16, 18 and the tensile component 30 between the open mold portions 66A, 66B. This may be accomplished by the use of shuttle frames (not shown) that separately hold the various components of the cushioning article 10, 110, or 310 in alignment with one another and with the mold components 66A, 66B, 53A, 53B, as shown in FIG. 15. When manufacturing the cushioning article 110, the first and second polymeric sheets 16, 18 may already by bonded to the respective tensile layers 32, 34 of the tensile component 30 rearward of the dividing line 113 when placed in the mold cavity 68, such as by lamination or by the use of adhesive. Alternatively, as shown in FIG. 15, the first and second polymeric sheets 16, 18 may not yet be bonded to the tensile component 30. Once the components of the cushioning article 10, 110, or 310 are positioned in the mold cavity 68, one or both of the mold components 66A, 66B is translated toward the other mold component to close the mold cavity 68.

Next, in block 218, the first polymeric sheet 16 and the second polymeric sheet 18 are conformed to components of the mold 66, as shown in FIG. 16. For example, the outer surface 49 of the first polymeric sheet 16 is conformed to the surface 76 of the mold insert 53A. The surface 76 includes the plurality of protrusions 51. Portions of the outer surface 49 of the first polymeric sheet 16 are conformed directly to the mold surface 78 of the first mold portion 66A adjacent to the first mold insert 53A. Conforming of the first polymeric sheet 16 to the surface 76, including the plurality of protrusions 51, depresses the first polymeric sheet 16 toward the second polymeric sheet 18 at the plurality of protrusions 51, with the plurality of protrusions 51 directly outward of some of the plurality of tethers 36. In block 218, the outer surface 54 of the second polymeric sheet 18 is also conformed to the surface 77 of the second mold insert 53B and to the mold surface 79 of the second mold portion 66B adjacent to the second mold insert 53B, indicated in FIG. 16. Conforming the polymeric sheets 16, 18 to the surfaces of the mold inserts 53A, 53B and the mold portions 66A, 66B may include applying a vacuum to the mold cavity 68 to pull the polymeric sheets 16, 18 against the surfaces 76, 77, 78, 79. Alternatively or in addition, conforming the polymeric sheets 16, 18 to the surfaces may include pressurizing the mold cavity 68, thereby compressing the polymeric sheets 16, 18 against the surfaces 76, 77, 78, 79.

After or contemporaneously with the first and second polymeric sheets 16, 18 conforming to the surfaces 76, 77, 78, 79 in block 218, the first tensile layer 32 may be thermally bonded to the first polymeric sheet 16 and the second tensile layer 34 may be thermally bonded to the second polymeric sheet 18 opposite the first tensile layer 32 in block 220. The heating of the polymeric sheets 16, 18, the tensile layers 32, 34, and/or the mold components 53A, 53B, 66A, 66B in addition to the vacuum and/or pressurization of the mold cavity 68 enables the thermal bonding at the surface bonds 40, 44 and the inwardly-protruding bonds 50. When the components of the cushioning article 10 are cooled, the bonds 40, 44, 50 remain. Conforming in block 218 and thermally bonding in block 220 may be referred to as thermoforming, and produces the inwardly-protruding bonds 50 at the protrusions 51 that join the first polymeric sheet 16 and the first tensile layer 32 and partially traverse the plurality of tethers 36, with the inwardly-protruding bonds 50 protruding toward the second polymeric sheet 18 but remaining spaced apart from the second tensile layer 34 and the second polymeric sheet 18 as described with respect to FIG. 3.

The thermal bonding of block 220 may include heating the first polymeric sheet 16 and the second polymeric sheet 18 prior to disposing the first polymeric sheet 16 and the second polymeric sheet 18 in the mold cavity 68. Alternatively or in addition, the thermal bonding may include heating one or more of the mold components 53A, 53B, 66A, 66B, or radio frequency welding via the mold 66.

Following block 220 or contemporaneously with block 220, the method 210 may include block 222, bonding the first polymeric sheet 16 to the second polymeric sheet 18 at the peripheral bond 20 such that the first polymeric sheet 16 and the second polymeric sheet 18 at least partially enclose the interior cavity 22 containing the tensile component 30. For example, bonding the first polymeric sheet 16 and the second polymeric sheet 18 at the peripheral bond 20 in block 222 may include compressing the first polymeric sheet 16 and the second polymeric sheet 18 between the first mold portion 66A and the second mold portion 66B in the closed position, as shown in FIG. 16. A small portion of the periphery of the first and second polymeric sheets 16, 18 can be left unbonded, such as at an inflation port 82 molded into the sheets in blocks 218 and 220.

After block 222, the mold cavity 68 may be opened in block 224 by translating one or both of the mold portions 66A, 66B away from one another. The cushioning article 10 can then be removed from the mold cavity 68 in block 226.

In block 228, the interior cavity 22 can be inflated to a desired inflation pressure, such as through the inflation port 82 of FIG. 1. For example, a fill tube may fit into the inflation port 82 or may be integrally formed by the sheets 16, 18 at the inflation port 82. Prior to or after inflating the interior cavity 22 in block 228, excess material of the sheets 16, 18 around the peripheral bond 20 can be trimmed. Gas, such as air, can be dispensed from a pressurized source or pumped into the interior cavity 22 through the inflation port 82 from a pressurized source. In some embodiments, the interior cavity 22 is not inflated, but instead simply retains gas at atmospheric pressure.

The interior cavity 22 is sealed in block 230. In the embodiment shown, this may be accomplished by sealing the inflation port 82, such as by thermally bonding the sheets 16, 18 to one another at the inflation port 82, adhering the sheets 16, 18 to one another at the inflation port 82, or plugging the inflation port 82. In FIG. 1, the sheets 16, 18 and any fill tube is already trimmed, and the inflation port 82 is sealed. The cushioning article 10, 110, or 310 is completely manufactured once block 230 is completed, and is ready to be assembled in the article of footwear 14. If the interior cavity 22 is inflated to a sufficient pressure, portions of the polymeric sheet 16 and/or 18 of the cushioning article 10, 110, or 310 that forms domed portions with domed surfaces 49A-49D, 54A-54J, etc., and the plurality of tethers 36A at the bonds 50 are tensioned, creating the grooves 52 in the outer surface 49 of the first polymeric sheet 16 and at the outer surface 54 of the second polymeric sheet 18 at the inwardly-protruding bonds 50, thereby articulating the cushioning article 10, 110, or 310 as discussed with respect to FIG. 6, with the grooves 52 establishing flexion axes.

Figure 19:
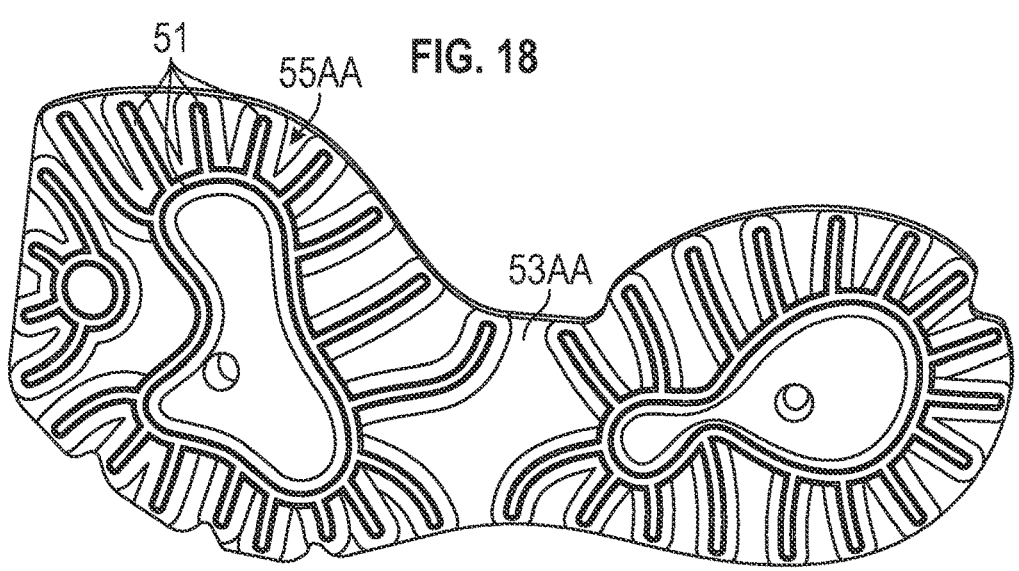
FIG. 19 is a schematic perspective illustration of a second mold insert for use with the mold portion of FIG. 17.

It should be appreciated that, although in FIGS. 15-16 the mold component having the protrusions 51 that create the inwardly-protruding bonds 50 is a mold insert 53A and/or 53B, either or both of the mold portions 66A, 66B could have one or more protrusions, and no mold insert need be used. However, the use of mold inserts may allow the production of cushioning articles having different bond patterns with lower tooling expense. For example, the same mold portions 66A, 66B may be used with a different tooling insert having a different pattern of protrusions to produce cushioning articles with different bond patterns. For example, FIG. 19 shows a different mold insert 53AA with a different pattern 55AA of protrusions 51. The protrusions 51 of the mold insert 53AA are shaped, dimensioned, or positioned differently than the protrusions 51 of the first mold insert 53A such that the pattern of protrusions 51 of mold insert 53AA is different than the first pattern of protrusions of mold insert 53A.

After manufacturing the cushioning article having a first bond pattern (i.e., a first pattern of inwardly-protruding bonds corresponding to the first pattern of protrusions of the first mold insert 53A), the method 210 may include block 232, removing the first mold insert 53A from the mold cavity 68. Then, in block 234, the different mold insert 53AA may be secured to the mold portion 66A, using fasteners 72 extending through openings 70, 74 as described with respect to the mold insert 53A. Mold insert 53B may also be replaced with a different mold insert with a different pattern of protrusions. With the mold insert 53AA now disposed in the mold cavity 68, and potentially a different mold insert secured to mold portion 66B and disposed in the cavity 68, blocks 211 to 230 of the method 210 can now be repeated to manufacture a second cushioning article that is a full length sole component having a different bond pattern than the first full length sole component produced using mold inserts 53A, 53B the different bond pattern being a pattern of inwardly-protruding bonds 50 as described herein, but corresponding to the different pattern of protrusions of the different mold insert 53AA, for example.

For example, in repeating blocks 211 to 230, block 216 is repeated by disposing a subsequent first polymeric sheet 16, a subsequent second polymeric sheet 18, and a subsequent tensile component 30 in the mold cavity 68 with the subsequent tensile component between the subsequent first polymeric sheet and the subsequent second polymeric sheet. Block 218 is repeated by conforming the subsequent first polymeric sheet to the different mold insert 53AA and the subsequent second polymeric sheet to a different mold insert or to another one of the mold components (e.g., a mold component similar to mold component 66B), respectively, the conforming depressing the subsequent first polymeric sheet toward the subsequent second polymeric sheet at the second protrusion 51 (i.e., at one of the protrusions 51 of the different mold insert 53AA), with the second protrusion directly outward of the subsequent tensile component. For example, block 220 is repeated, thermally bonding the first tensile layer of the subsequent tensile component to the subsequent first polymeric sheet and the second tensile layer of the subsequent tensile component to the subsequent second polymeric sheet to produce a second inwardly-protruding bond 50 at the second protrusion partially traversing the subsequent tensile component. The same mold portions and mold cavity thus provide a second cushioning article with a different bond pattern than the first cushioning article due to the different mold insert 53AA, and simply by removing the first mold insert 53A and replacing it with the different mold insert 53AA, and, when manufacturing a cushioning article with inwardly-protruding bonds 50 at the second polymeric sheet 18, such as cushioning article 10, potentially replacing the second mold insert 53B with a different mold insert.

To assist and clarify the description of various embodiments, various terms are defined herein. Unless otherwise indicated, the following definitions apply throughout this specification (including the claims). Additionally, all references referred to are incorporated herein in their entirety.

An "article of footwear", a "footwear article of manufacture", and "footwear" may be considered to be both a machine and a manufacture. Assembled, ready to wear footwear articles (e.g., shoes, sandals, boots, etc.), as well as discrete components of footwear articles (such as a midsole, an outsole, an upper component, etc.) prior to final assembly into ready to wear footwear articles, are considered and alternatively referred to herein in either the singular or plural as "article(s) of footwear" or "footwear".

"A", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. As used in the description and the accompanying claims, unless stated otherwise, a value is considered to be "approximately" equal to a stated value if it is neither more than 5 percent greater than nor more than 5 percent less than the stated value. In addition, a disclosure of a range is to be understood as specifically disclosing all values and further divided ranges within the range.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

For consistency and convenience, directional adjectives may be employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims.

The term "longitudinal" refers to a direction extending a length of a component. For example, a longitudinal direction of an article of footwear extends between a forefoot region and a heel region of the article of footwear. The term "forward" or "anterior" is used to refer to the general direction from a heel region toward a forefoot region, and the term "rearward" or "posterior" is used to refer to the opposite direction, i.e., the direction from the forefoot region toward the heel region. In some cases, a component may be identified with a longitudinal axis as well as a forward and rearward longitudinal direction along that axis. The longitudinal direction or axis may also be referred to as an anterior-posterior direction or axis.

The term "transverse" refers to a direction extending a width of a component. For example, a transverse direction of an article of footwear extends between a lateral side and a medial side of the article of footwear. The transverse direction or axis may also be referred to as a lateral direction or axis or a mediolateral direction or axis.

The term "vertical" refers to a direction generally perpendicular to both the lateral and longitudinal directions. For example, in cases where a sole structure is planted flat on a ground surface, the vertical direction may extend from the ground surface upward. It will be understood that each of these directional adjectives may be applied to individual components of a sole structure. The term "upward" or "upwards" refers to the vertical direction pointing towards a top of the component, which may include an instep, a fastening region and/or a throat of an upper. The term "downward" or "downwards" refers to the vertical direction pointing opposite the upwards direction, toward the bottom of a component and may generally point towards the bottom of a sole structure of an article of footwear.

The "interior" of an article of footwear, such as a shoe, refers to portions at the space that is occupied by a wearer's foot when the article of footwear is worn. The "inner side" of a component refers to the side or surface of the component that is (or will be) oriented toward the interior of the component or article of footwear in an assembled article of footwear. The "outer side" or "exterior" of a component refers to the side or surface of the component that is (or will be) oriented away from the interior of the article of footwear in an assembled article of footwear. In some cases, other components may be between the inner side of a component and the interior in the assembled article of footwear. Similarly, other components may be between an outer side of a component and the space external to the assembled article of footwear. Further, the terms "inward" and "inwardly" refer to the direction toward the interior of the component or article of footwear, such as a shoe, and the terms "outward" and "outwardly" refer to the direction toward the exterior of the component or article of footwear, such as the shoe. In addition, the term "proximal" refers to a direction that is nearer a center of a footwear component, or is closer toward a foot when the foot is inserted in the article of footwear as it is worn by a user. Likewise, the term "distal" refers to a relative position that is further away from a center of the footwear component or is further from a foot when the foot is inserted in the article of footwear as it is worn by a user. Thus, the terms proximal and distal may be understood to provide generally opposing terms to describe relative spatial positions.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

While several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. An article of footwear comprising:
    a sole structure including:
        a sole layer; and
        a cushioning article in contact with the sole layer, the cushioning article including:
            a bladder enclosing an interior cavity and retaining a gas in the interior cavity;
            a tensile component disposed in the interior cavity and including tensile layers and a plurality of tethers connecting the tensile layers, the tensile layers connected to an inner surface of the bladder at a plurality of bonds such that the tethers span across the interior cavity;
        wherein the plurality of bonds are arranged in closed shapes surrounding domed portions of the bladder;
        wherein activated anti-weld material is disposed on selected areas of the tensile component;
        wherein the plurality of bonds bond the inner surface of the bladder to the tensile component, the domed portions of the bladder are unbonded to the tensile component at the selected areas on which the activated anti-weld material is disposed, the domed portions are displaced from the tensile component by the gas; and
        wherein each of the plurality of bonds protrudes inward into the interior cavity and partially traverses the plurality of tethers such that the bladder is narrowed at the plurality of bonds.

2. The article of footwear of claim 1, wherein the bladder comprises a first polymeric sheet and a second polymeric sheet bonded to one another at a peripheral flange and enclosing the interior cavity; and
    wherein the tensile layers include a first tensile layer connected to the first polymeric sheet and a second tensile layer connected to the second polymeric sheet, at least one of the first polymeric sheet and the second polymeric sheet including the domed portions.

3. The article of footwear of claim 1, wherein when an inflation pressure of the gas in the interior cavity is sufficient to tension the plurality of tethers, the plurality of bonds defines grooves at an outer surface of the bladder such that the cushioning article is articulated along the grooves.

4. The article of footwear of claim 1, wherein the plurality of bonds is a first plurality of bonds in a first region of the bladder, and the bladder has a second plurality of bonds arranged in closed shapes in a second region of the bladder, and portions of the bladder surrounded by the closed shapes in the second region are bonded to the tensile component.

5. The article of footwear of claim 4, wherein the cushioning article is a sole component of an article of footwear, the first region is on a distal side of the bladder, and the second region is on a proximal side of the bladder.

6. The article of footwear of claim 4, wherein the cushioning article is a sole component of an article of footwear, and the first region and the second region are both on a distal side of the bladder or are both on a proximal side of the bladder.

7. The article of footwear of claim 1, wherein the sole layer and the cushioning article are configured as a midsole, and the sole layer at least partially overlays the cushioning article.

8. The article of footwear of claim 1, wherein the domed portions are configured to resiliently deform under dynamic compressive loading, including at least partially flattening during a foot strike.

9. The article of footwear of claim 1, wherein the cushioning article has a forefoot region and the domed portions are in the forefoot region.

10. The article of footwear of claim 1, wherein the cushioning article has a heel region and the domed portions are in the heel region.

11. The article of footwear of claim 1, wherein the cushioning article has a forefoot region, a midfoot region, and a heel region.

12. The article of footwear of claim 1, wherein the domed portions are on a distal side of the cushioning article.

13. The article of footwear of claim 1, wherein the plurality of bonds are a first plurality of bonds in a first region of the bladder, and the bladder has a second plurality of bonds arranged in closed shapes in a second region of the bladder, and portions of the bladder surrounded by the closed shapes in the second region are unbonded to the tensile component at the selected areas on which the activated anti-weld material is disposed and form domed portions that are displaced from the tensile component by the gas.

14. The article of footwear of claim 1, wherein the cushioning article is encased in the sole layer.

15. An article of footwear comprising:
a sole structure including:
a sole layer; and
a cushioning article in contact with the sole layer, the cushioning article including:
a first polymeric sheet and a second polymeric sheet bonded to one another and enclosing an interior cavity, the first polymeric sheet and the second polymeric sheet retaining a gas in the interior cavity;
a tensile component disposed in the interior cavity, the tensile component including a first tensile layer, a second tensile layer, and a plurality of tethers spanning the interior cavity from the first tensile layer to the second tensile layer and connecting the first tensile layer to the second tensile layer; and
a plurality of inwardly-protruding bonds that join the first polymeric sheet to the first tensile layer, protrude inward from the first polymeric sheet toward the second polymeric sheet, and partially traverse the plurality of tethers;
wherein the inwardly-protruding bonds are linear bonds arranged in closed polygonal shapes surrounding domed portions of the first polymeric sheet at which the first polymeric sheet is displaced from the first tensile layer by the gas;
wherein the inwardly-protruding bonds are spaced apart from the second polymeric sheet such that the interior cavity is narrowed at the inwardly-protruding bonds; and
wherein the closed polygonal shapes of the inwardly-protruding bonds surrounding three consecutive domed portions are arranged so that each has an inwardly-protruding bond aligned with a flexion axis of the sole structure.

16. The article of footwear of claim 15, wherein a portion of the interior cavity at a first side of each inwardly-protruding bond is in fluid communication with a portion of the interior cavity at a second side of the inwardly-protruding bond, the second side opposite of the first side.

17. The article of footwear of claim 15, wherein:
the plurality of tethers includes tethers aligned with the inwardly-protruding bonds and tethers displaced from the inwardly-protruding bonds; and
the tethers aligned with the inwardly-protruding bonds are shorter, thicker, or both shorter and thicker than the tethers displaced from the inwardly-protruding bonds.

18. The article of footwear of claim 15, wherein the flexion axis extends transversely in a forefoot region of the cushioning article.

19. The article of footwear of claim 15, wherein the flexion axis extends in a heel region of the cushioning article.

20. The article of footwear of claim 15, wherein the closed polygonal shapes of the inwardly-protruding bonds surrounding three additional consecutive domed portions are arranged so that each has an inwardly-protruding bond aligned with the flexion axis of the sole structure, the flexion axis extending between the three consecutive domed portions and the three additional consecutive domed portions.

* * * * *